United States Patent
Norieda et al.

(10) Patent No.: US 10,234,955 B2
(45) Date of Patent: Mar. 19, 2019

(54) INPUT RECOGNITION APPARATUS, INPUT RECOGNITION METHOD USING MAKER LOCATION, AND NON-TRANSITORY COMPUTER-READABLE STORAGE PROGRAM

(71) Applicant: NEC Corporation, Monato-ku, Tokyo (JP)

(72) Inventors: Shin Norieda, Tokyo (JP); Makoto Yoshimoto, Tokyo (JP); Yoshinori Saida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/759,323

(22) PCT Filed: Sep. 20, 2016

(86) PCT No.: PCT/JP2016/077730
§ 371 (c)(1),
(2) Date: Mar. 12, 2018

(87) PCT Pub. No.: WO2017/057107
PCT Pub. Date: Apr. 6, 2017

(65) Prior Publication Data
US 2018/0260032 A1  Sep. 13, 2018

(30) Foreign Application Priority Data
Sep. 28, 2015  (JP) .................. 2015-190239

(51) Int. Cl.
*G06T 7/11* (2017.01)
*G06T 7/20* (2017.01)
(Continued)

(52) U.S. Cl.
CPC ......... *G06F 3/017* (2013.01); *G02B 27/0172* (2013.01); *G06F 3/01* (2013.01);
(Continued)

(58) Field of Classification Search
CPC .............. G06F 3/017; G06T 7/11; G06T 7/20
See application file for complete search history.

(56) References Cited

U.S. PATENT DOCUMENTS 5,799,099 A * 8/1998 Wang ................ G06T 7/194
382/131
6,415,043 B1 * 7/2002 Josefsson ............. A61B 5/1127
348/141
(Continued)

FOREIGN PATENT DOCUMENTS

JP  2000-102036 A   4/2000
JP  2011-257943 A  12/2011
(Continued)

OTHER PUBLICATIONS

International Search Report for PCT Application No. PCT/JP2016/077730, dated Nov. 22, 2016.
(Continued)

*Primary Examiner* — Gandhi Thirugnanam

(57) ABSTRACT

An input apparatus (2000) includes a position calculation unit (2020) and an input recognition unit (2040). The position calculation unit (2020) calculates a position of a marker included in a captured image. The marker is attached to the body of a user or is a part of the body of the user. The captured image is generated by a camera at a timing based on a result of detection by a sensor attached to the body of the user. The input recognition unit (2040) recognizes input specifying a location separated from the marker on the captured image on the basis of the calculated position of the marker. The location specified by the input is a location separated from the marker.

20 Claims, 30 Drawing Sheets

(51) Int. Cl.
  *G06T 7/60* (2017.01)
  *G06T 7/70* (2017.01)
  *G02B 27/01* (2006.01)
  *G06F 3/0482* (2013.01)
  *G06F 3/0484* (2013.01)
  *G06F 3/0488* (2013.01)
  *G06F 3/01* (2006.01)

(52) U.S. Cl.
  CPC .......... *G06F 3/0482* (2013.01); *G06F 3/0484* (2013.01); *G06F 3/04886* (2013.01); *G06T 7/11* (2017.01); *G06T 7/20* (2013.01); *G06T 7/60* (2013.01); *G06T 7/70* (2017.01); *G02B 2027/0138* (2013.01); *G02B 2027/0178* (2013.01); *G06T 2207/30204* (2013.01)

(56) References Cited

U.S. PATENT DOCUMENTS

| 2012/0062736 | A1* | 3/2012 | Xiong | G06F 3/017 348/143 |
| 2014/0126782 | A1* | 5/2014 | Takai | G06K 9/0061 382/116 |
| 2015/0001677 | A1* | 1/2015 | Palumbo | H01L 29/405 257/536 |
| 2015/0186708 | A1* | 7/2015 | Katz | G06K 9/00087 382/115 |
| 2017/0255838 | A1* | 9/2017 | Norieda | G06K 9/4671 |
| 2018/0260032 | A1* | 9/2018 | Norieda | G06T 7/11 |
| 2018/0260033 | A1* | 9/2018 | Norieda | G06T 7/248 |
| 2018/0267619 | A1* | 9/2018 | Norieda | G06F 3/017 |

FOREIGN PATENT DOCUMENTS

| JP | 2013-114467 A | 6/2013 |
| JP | 2013-190941 A | 9/2013 |
| JP | 2015-504616 A | 2/2015 |

OTHER PUBLICATIONS

International Preliminary Report on Patentability for PCT Application No. PCT/JP2016/077730, dated Sep. 7, 2017.

* cited by examiner

INPUT RECOGNITION APPARATUS, INPUT RECOGNITION METHOD USING MAKER LOCATION, AND NON-TRANSITORY COMPUTER-READABLE STORAGE PROGRAM

This application is a National Stage Entry of PCT/JP2016/077730 filed on Sep. 20, 2016, which claims priority from Japanese Patent Application 2015-190239 filed on Sep. 28, 2015, the contents of all of which are incorporated herein by reference, in their entirety.

TECHNICAL FIELD

The present invention relates to an input apparatus, an input method, and a program.

BACKGROUND ART

A technique has been developed in which an action such as a gesture input performed on a space by a user is imaged by a camera, a generated captured image is analyzed, and thus the user's input operation on an information processing apparatus is recognized. Patent Document 1 discloses a technique in which a menu screen is displayed on the palm or the menu screen is changed according to a gesture of the palm of a user (for example, a gesture of opening the palm).

Patent Document 2 discloses a technique of performing input by using a virtual keyboard displayed on a head mounted display. Patent Document 2 discloses a technique in which the virtual keyboard is fixed to an object on a real space, and thus a position of the virtual keyboard is not changed even if the head of a person wearing the head mounted display is moved.

RELATED DOCUMENT

Patent Document

[Patent Document 1] U.S. Patent Application Publication No. 2015/0016777

[Patent Document 2] PCT Japanese Translation Patent Publication No. 2015-504616

SUMMARY OF THE INVENTION

Technical Problem

In a case where an object included in a captured image is analyzed, and an input operation of a user is recognized, it is hard to determine a timing at which the input operation was performed. Thus, there is a probability that an input operation may be wrongly recognized despite the user not performing the input operation, or an input operation may not be recognized despite the user performing the input operation.

The present invention has been made in light of the problem. An object of the present invention is to provide a technique of improving the recognition accuracy when a user's input operation is recognized from a captured image.

Solution to Problem

According to the present invention, there is provided an input apparatus including 1) a position calculation unit calculating a position of a marker at a timing based on a result of detection by a sensor attached to the body of a user by using a captured image including the marker; and 2) an input recognition unit recognizing input specifying a location on the captured image on the basis of the calculated position of the marker. The specified location is a location separated from the marker. The marker is attached to the body of the user or is a part of the body of the user.

According to the present invention, there is provided an input method executed by a computer. The input method includes 1) a position calculation step of calculating a position of a marker at a timing based on a result of detection by a sensor attached to the body of a user by using a captured image including the marker; and 2) an input recognition step of recognizing input specifying a location separated from the marker on the captured image on the basis of the calculated position of the marker. The specified location is a location separated from the marker. The marker is attached to the body of the user or is a part of the body of the user.

Advantageous Effects of Invention

According to the present invention, there is provided a technique of improving the recognition accuracy when a user's input operation is recognized from a captured image.

BRIEF DESCRIPTION OF THE DRAWINGS

The above-described object, and other objects, features and advantages will become more apparent on the basis of preferred embodiments described below and the following accompanying drawings.

DESCRIPTION OF EMBODIMENTS

Figure 1:
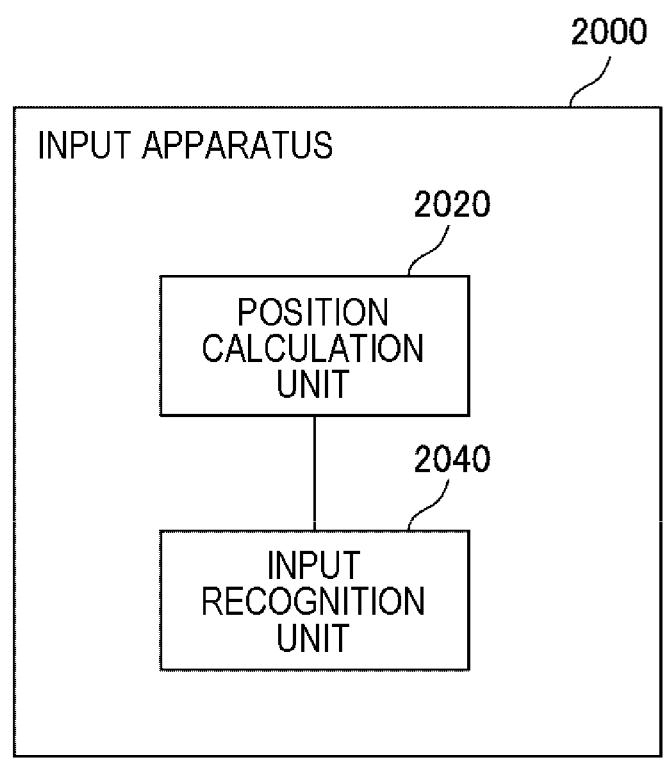
FIG. 1 is a block diagram illustrating an input apparatus according to Example Embodiment 1.

Hereinafter, example embodiments of the present invention will be described with reference to the drawings. The same constituent elements are given the same reference numerals throughout all the drawings, and description thereof will not be repeated as appropriate.

Example Embodiment 1

FIG. 1 is a block diagram illustrating an input apparatus 2000 according to Example Embodiment 1. In FIG. 1, each block indicates not a configuration in the hardware unit but a configuration in the functional unit.

The input apparatus 2000 includes a position calculation unit 2020 and an input recognition unit 2040. The position calculation unit 2020 calculates a position of a marker at a timing based on a result of detection by a sensor attached to a user's body, by using a captured image including the marker. The marker is attached to the user's body or a part of the user's body. The input recognition unit 2040 recognizes input specifying a location on a captured image on the basis of the calculated position of the marker. The location specified by the input is a location separated from the marker.

FIG. 2 are diagrams for conceptually explaining an operation of the input apparatus 2000. A captured image 22 is generated by a camera imaging the periphery of the user.

In this example, a marker is worn by the user using the input apparatus 2000. In FIG. 2, a watch type device 10 is worn on the left arm 50 of the user. The device 10 displays a marker image 16 on a touch panel 14. The marker image 16 functions as a marker.

Figure 2A:
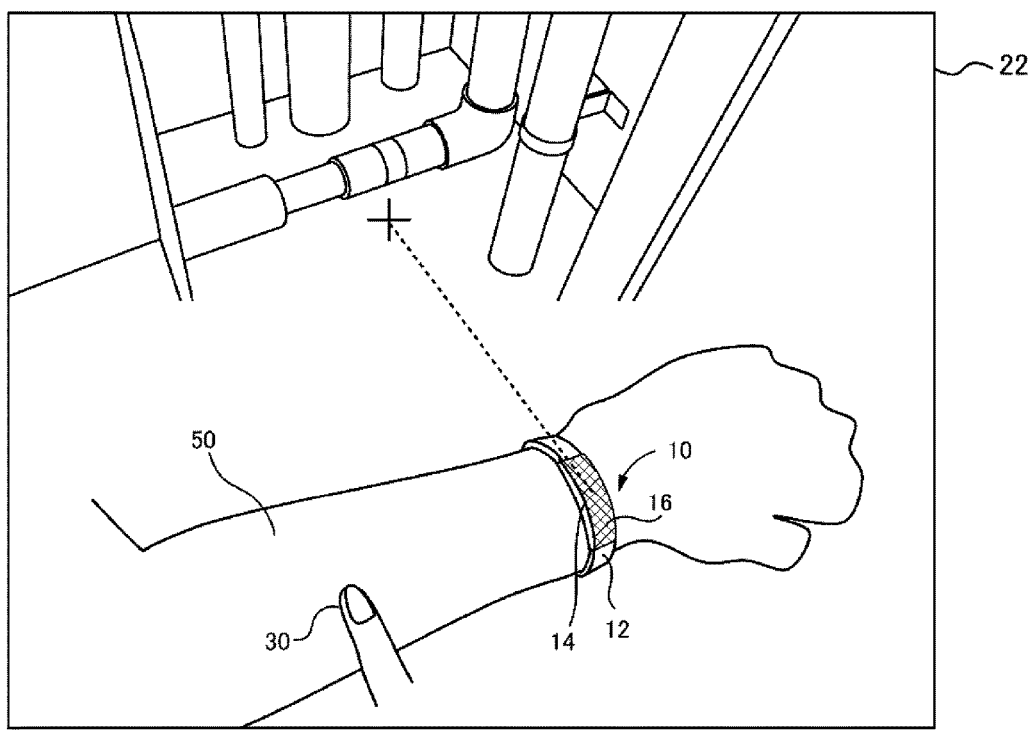
FIG. 2 are diagrams for conceptually explaining an operation of the input apparatus.
Figure 2B:
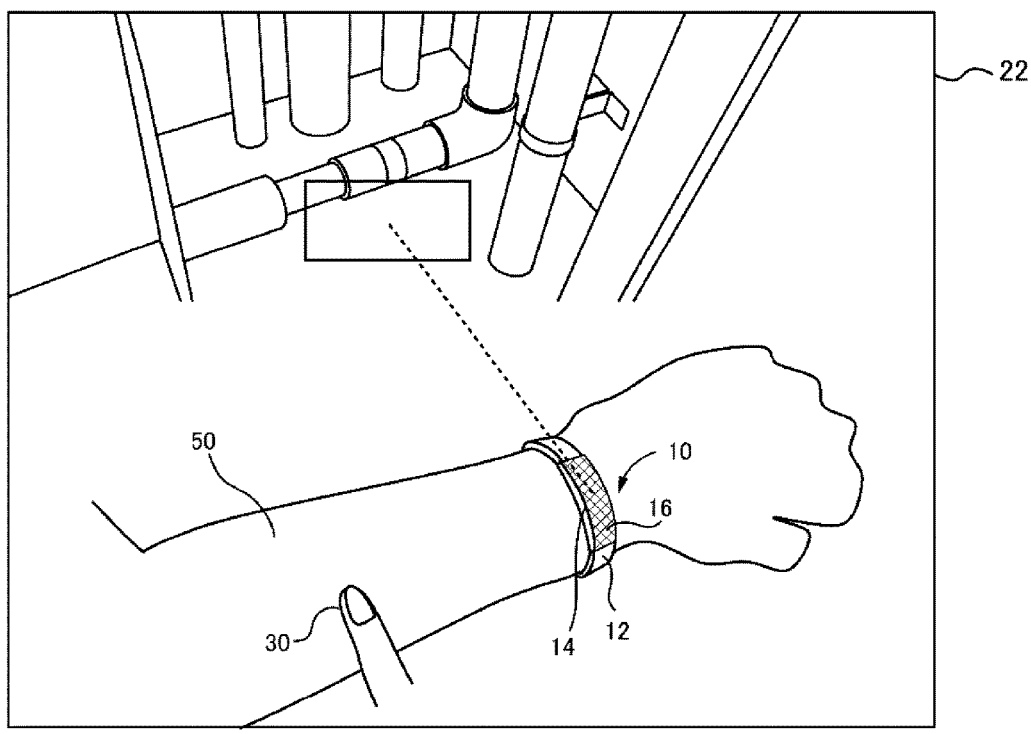

The user performs an input operation of specifying a location such as a point or a range at a position separated from the marker by using the input apparatus 2000. In FIG. 2A, a point on the captured image 22 separated from the marker image 16 is specified on the basis of the position of the marker image 16. In FIG. 2B, a region on the captured image 22 separated from the marker image 16 is specified on the basis of the position of the marker image 16. An apparatus operated by such input may be the input apparatus 2000, and may be apparatuses other than the input apparatus 2000.

Here, the input apparatus 2000 uses a sensor worn by the user for recognition of an input operation performed by the user. In the example illustrated in FIG. 2, a sensor 12 is built into the device 10. The sensor 12 is, for example, a vibration sensor. For example, the user taps the left arm 50 at a timing at which an input operation is performed. The position calculation unit 2020 calculates a position of the marker from the captured image 22 generated at a timing at which vibration is detected by the vibration sensor or at a timing close thereto. The input apparatus 2000 recognizes input specifying a certain location on the captured image 22 separated from the marker on the basis of the calculated position of the marker.

The input apparatus 2000 recognizes that the tapping or the like is detected by the sensor, and can thus recognize that the input operation is performed by the user. Thus, according to the input apparatus 2000, it is possible to prevent an input operation from not being recognized despite the user performing the input operation, or an input operation from being wrongly recognized despite the user not performing the input operation, and thus to accurately recognize an input operation intended by the user.

An operation of the input apparatus 2000 described with reference to FIG. 2 is an example for better understanding of the input apparatus 2000, and an operation of the input apparatus 2000 is not limited to the above-described example. Details or variations of an operation of the input apparatus 2000 will be described later.

<Example of Hardware Configuration of Input Apparatus 2000>

Each functional configuration unit of the input apparatus 2000 may be realized by hardware (for example, a hardware electronic circuit), or may be realized by a combination of hardware and software (for example, a combination of an electronic circuit and a program for controlling the electronic circuit). Hereinafter, a further description will be made of a case where each functional configuration unit of the input apparatus 2000 is realized by a combination of hardware and software.

Figure 3:
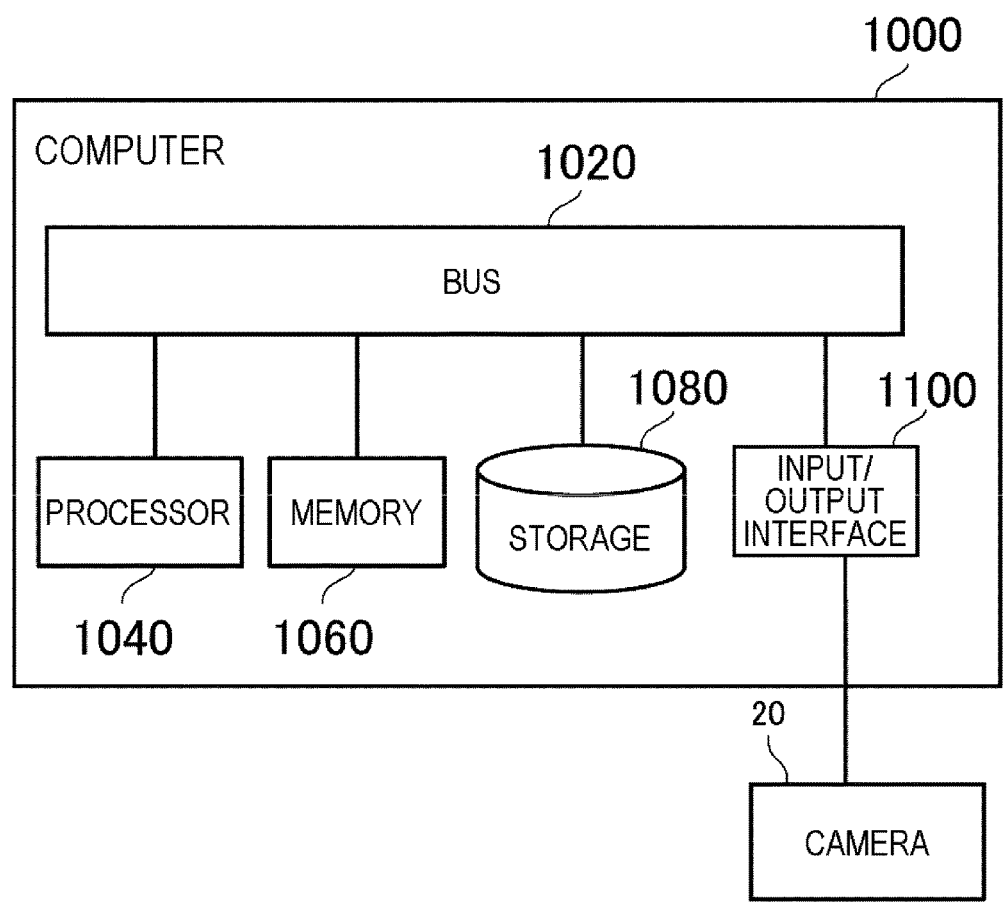
FIG. 3 is a diagram illustrating a configuration of a computer realizing the input apparatus.

FIG. 3 is a diagram illustrating a configuration of a computer 1000 realizing the input apparatus 2000. The computer 1000 is various computers such as a head mounted display, a tablet terminal, a smart phone, a personal computer (PC), or a server machine. The computer 1000 may be a special purpose computer designed to realize the input apparatus 2000, or may be a general purpose computer. The computer 1000 includes a bus 1020, a processor 1040, a memory 1060, a storage 1080, and an input/output interface 1100. The bus 1020 is a transmission path for transmitting and receiving data among the processor 1040, the memory 1060, and the storage 1080. However, a method of connecting the processor 1040 and the like to each other is not limited to connection using a bus. The processor 1040 is, for example, a processor such as a central processing unit (CPU) or a graphics processing unit (GPU). The memory 1060 is, for example, a random access memory (RAM) or a read only memory (ROM). The storage 1080 is, for example, a storage device such as a hard disk, a solid state drive (SSD), or a memory card. The storage 1080 may be a memory such as a RAM or a ROM.

The input/output interface 1100 connects the computer 1000 to input and output devices. In FIG. 3, the input/output interface 1100 is connected to a camera 20. The camera 20 is any camera which can image the periphery of the user. The camera 20 repeatedly performs imaging, and generates a captured image 22 indicating each imaging result. Note that the camera 20 may be a two-dimensional (2D) camera, or may be a three-dimensional (3D) camera.

The camera 20 is provided at any location. For example, the camera 20 is attached to an object worn by the user. The object worn by the user is, for example, a head mounted display or an employee ID card held from the neck of the user. For example, the camera 20 may be provided on a wall of a room in which the user performs an input operation on the input apparatus 2000. In the latter case, it is preferable that an imaging range (an imaging direction or a zoom ratio) of the camera 20 can be changed through remote control using a remote controller.

Figure 4:
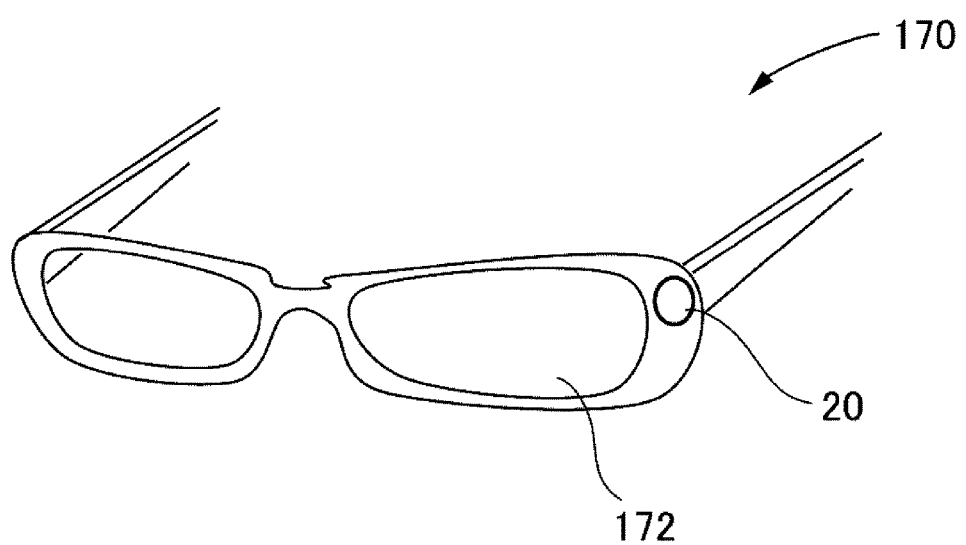
FIG. 4 is a diagram illustrating a scene in which a camera is provided on a head mounted display.

FIG. 4 is a diagram illustrating a scene in which the camera 20 is provided on a head mounted display. A head mounted display 170 illustrated in FIG. 4 includes a display 172 which is a transmissive display. The user views an image displayed on the display 172 while viewing scenery of the real world through the display 172, and can thus view a scene in which the image overlaps the scenery of the real world.

In FIG. 4, the camera 20 is provided near the display 172. Consequently, the camera 20 performs imaging in the same direction as a view direction of the user or a direction close thereto, and thus scenery included in the captured image 22 generated by the camera 20 can be made similar to scenery viewed by the user.

An imaging direction of the camera 20 is any direction, and is not limited to the view direction of the user or the direction close thereto. A position where the camera 20 is provided is not limited to the vicinity of the display 172. The head mounted display 170 provided with the camera 20 is a head mounted display having a transmissive display, and may be a head mounted display having a non-transmissive display. A relationship between the type of head mounted display and a method of implementing the input apparatus 2000 will be described later as necessary.

The storage 1080 stores a program module for realizing each functional configuration unit. The processor 1040 realizes a function of each functional configuration unit of the input apparatus 2000 by executing each program module. Here, when each module is executed, the processor 1040 may execute the module after reading the module to the memory 1060, or may execute the module without reading the module to the memory 1060.

A hardware configuration of the computer 1000 is not limited to the configuration illustrated in FIG. 4. For example, each program module may be stored in the memory 1060. In this case, the computer 1000 may not include the storage 1080.

<Flow of Process>

Figure 5:
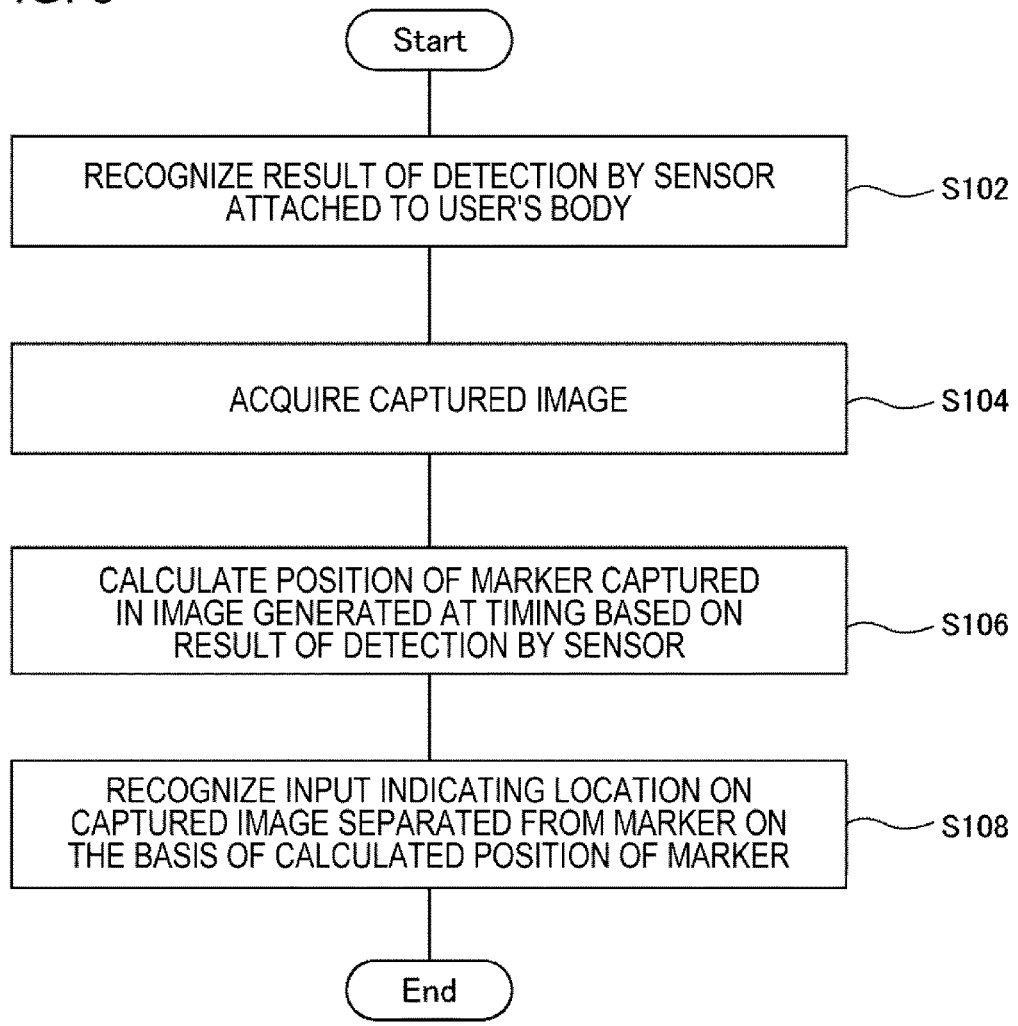
FIG. 5 is a flowchart illustrating a flow of a process performed by the input apparatus of Example Embodiment 1.

FIG. 5 is a flowchart illustrating a flow of a process performed by the input apparatus 2000 of Example Embodiment 1. The position calculation unit 2020 recognizes a result of detection by the sensor (S102). The position calculation unit 2020 acquires the captured image 22 (S104). The position calculation unit 2020 calculates a position of a marker included in the captured image 22 (106). The input recognition unit 2040 recognizes input specifying a location on the captured image 22 separated from the marker on the basis of the calculated position of the marker (S108).

<Sensor Worn by User>

A sensor worn by the user is any sensor used to recognize a timing of an input operation performed by the user, and is not limited to the above-described vibration sensor. The sensor may be, for example, an acceleration sensor, a vibration switch, a pressure sensor, or an electrostatic capacitance sensor. The acceleration sensor or the vibration switch is provided, for example, inside the device 10 in the same manner as the vibration sensor. The pressure sensor or the electrostatic capacitance sensor is provided on, for example, a touch panel of the device 10. For example, the pressure sensor or the electrostatic capacitance sensor may be provided on a sheet or the like bonded to or wound on the arm of the user. For example, the pressure sensor or the electrostatic capacitance sensor may be provided on clothes (sleeves) of the user.

<Details of Position Calculation Unit 2020>

<<Method of Recognizing Detection Result in Sensor>>

The position calculation unit 2020 recognizes a result of detection by the sensor attached to the body of the user of the input apparatus 2000 (S102). There are various methods in which the position calculation unit 2020 recognizes a result of detection by the sensor. Hereinafter, the methods will be described. Note that, hereinafter, as an example, a description will be made of a case where the sensor is the sensor 12 (vibration sensor) described in FIG. 2.

<<<Use of Wireless Communication>>>

For example, the position calculation unit 2020 performs wireless communication with device 10 having the sensor 12 built thereinto so as to acquire information indicating a result of detection by the sensor 12, and thus recognizes the result of detection by the sensor 12. For example, the device 10 transmits a predetermined signal to the position calculation unit 2020 at a timing at which the sensor 12 detects vibration of a predetermined magnitude or more. In this case, the position calculation unit 2020 can acquire the result of detection by the sensor 12 that "vibration has been detected by the sensor 12" by receiving the predetermined signal.

For example, in a case where vibration of a predetermined magnitude or more is detected by the sensor 12, the device 10 may transmit information indicating a time point at which the vibration is detected, to the position calculation unit 2020.

<<<Detection of Change in Appearance of Device 10>>>

The device 10 may change appearance of the device 10 according to detection of vibration in the sensor 12. In this case, the position calculation unit 2020 recognizes the result of detection by the sensor 12 (detection of the vibration performed by the sensor 12) by detecting a predetermined change by using an image generated by the camera 20.

Figure 6:
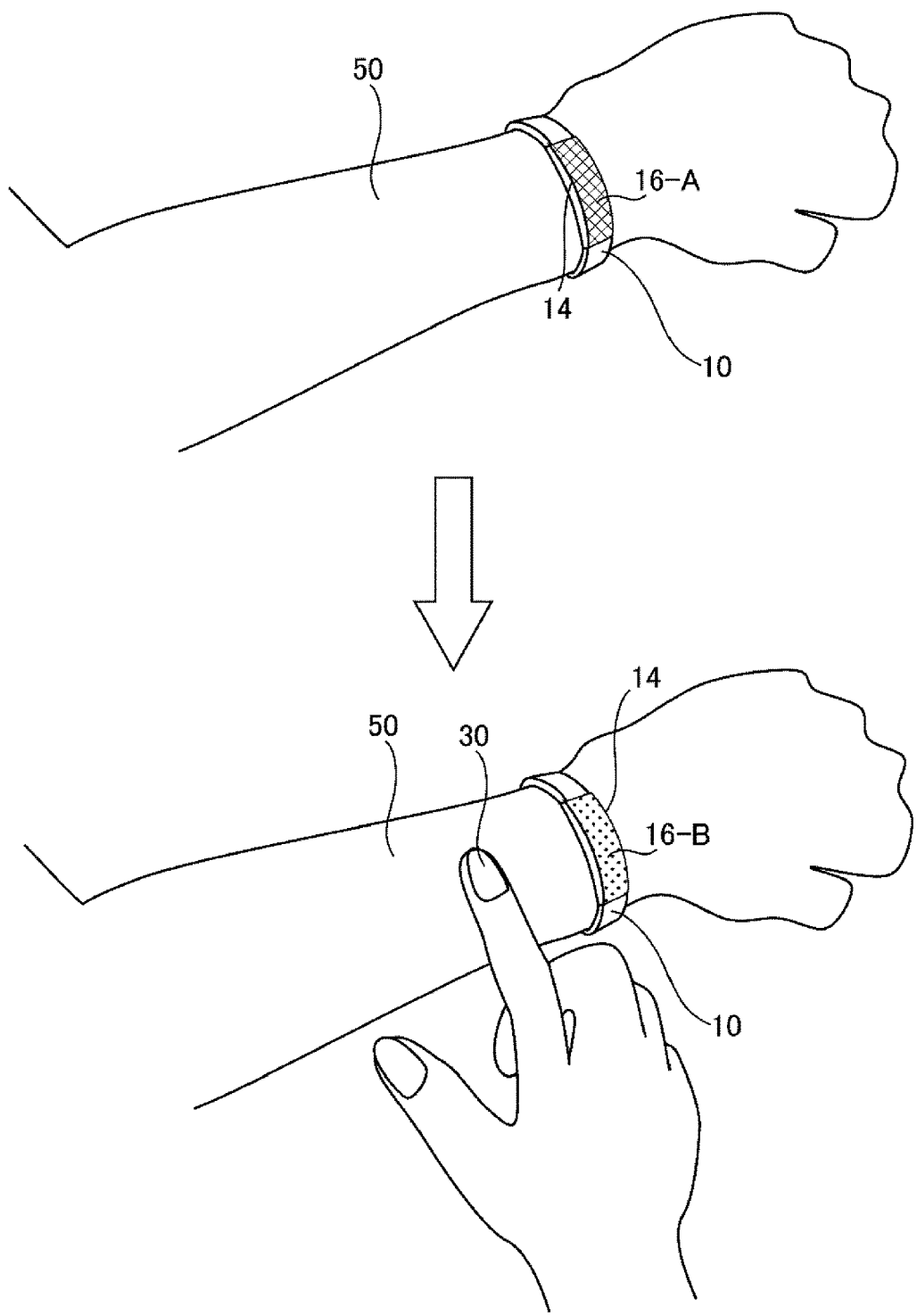
FIG. 6 is a diagram illustrating a scene in which a marker image displayed on a display screen of a device in a case where the left arm is tapped by a user.

For example, the device 10 changes display on a display screen when vibration of a predetermined magnitude or more is detected by the sensor 12. More specifically, when vibration of the predetermined magnitude or more is detected by the sensor 12, the device 10 changes an image displayed on the display screen of the device 10 or displays a new image on the display screen on which nothing has been displayed. The position calculation unit 2020 detects a change in the display on the display screen of the device 10 by analyzing images which are repeatedly generated by the camera 20. Consequently, the position calculation unit 2020 recognizes that the vibration has been detected by the sensor 12 built into the device 10. FIG. 6 is a diagram illustrating a scene in which the marker image 16 displayed on the display screen (touch panel 14) of the device 10 is changed in a case where the left arm 50 is tapped by the user.

For example, in a case where vibration is detected by the sensor 12, the device 10 may turn on or flash a light such as a backlight of the display screen of the device 10 or a light emitting diode (LED) light provided in the device 10. The position calculation unit 2020 detects turning-on or flashing of the light by analyzing images repeatedly generated by the camera 20. Consequently, the position calculation unit 2020 recognizes that the vibration has been detected by the sensor 12.

As mentioned above, if the position calculation unit 2020 recognizes detection of vibration by changing the appearance of the device 10 according to the detection of the vibration in the sensor 12, it is not necessary to perform wireless communication between the device 10 and the input apparatus 2000. Thus, the device 10 or the input apparatus 2000 may not have a wireless communication function as long as wireless communication is not necessary for other purpose.

A method in which the position calculation unit 2020 recognizes a result of detection by sensors other than the vibration sensor is the same as the method described for the vibration sensor. In a case where the sensor is an acceleration sensor or a vibration switch, when such a sensor detects acceleration or vibration of a predetermined magnitude or more, the device 10 or the position calculation unit 2020 performs the same process as when the vibration sensor detects vibration of a predetermined magnitude or more. For example, in a case where the sensor is a pressure sensor, when the pressure sensor detects pressure of a predetermined magnitude or more, the device 10 or the position calculation unit 2020 performs the same process as when the vibration sensor detects vibration of a predetermined magnitude or more. For example, in a case where the sensor is an electrostatic capacitance sensor, when the pressure sensor detects displacement of electrostatic capacitance of a predetermined magnitude or more, the device 10 or the position calculation unit 2020 performs the same process as when the vibration sensor detects vibration of a predetermined magnitude or more.

<<Method of Acquiring Captured Image 22>>

The position calculation unit 2020 acquires the captured image 22 (S104). There are various methods of the position calculation unit 2020 acquiring the captured image 22. For example, the position calculation unit 2020 acquires the captured image 22 from the camera 20. In this case, the input apparatus 2000 is communicably connected to the camera 20.

In a case where the camera 20 stores the captured image 22 in an external storage device, the position calculation unit 2020 acquires the captured image 22 from the storage device. In this case, the position calculation unit 2020 is communicably connected to the storage device.

<<Method of Determining Captured Image 22 to be Used>>

The position calculation unit 2020 calculates a position of a marker included in the captured image 22 (S106). The captured image 22 including the marker at a timing based on a result of detection by the sensor is used to calculate a position of the marker. Hereinafter, the "timing based on a result of detection by the sensor" will be referred to as a sensor timing.

The sensor timing is a timing at which vibration or the like is detected by the sensor or a timing close to the timing. For example, in a case where a predetermined signal is transmitted from the device 10 to the position calculation unit 2020 when vibration or the like is detected by the sensor 12, the sensor timing is a time point at which the position calculation unit 2020 receives the predetermined signal. In a case where information indicating a time point at which vibration or the like is detected by the sensor 12 is transmitted from the device 10 to the position calculation unit 2020, the sensor timing is the time point indicated by the information. For example, in a case where a predetermined change is added to the appearance of the device 10 when vibration or the like is detected by the sensor 12, the sensor timing is a time point at which the predetermined change is detected by the position calculation unit 2020.

The sensor timing may be a time point corresponding to a predetermined time before or after the above-described time point (for example, the time point at which the signal is received from the device 10). The predetermined time may be set in the position calculation unit 2020, or may be stored in a storage device which can be accessed from the position calculation unit 2020.

In a case where the sensor timing is set to a time point corresponding to a predetermined time before the time point at which the signal is received from the device 10, the captured image 22 generated by the camera 20 at the time point corresponding to the predetermined time before the time point at which the signal is received from the device 10 is necessary. Thus, the camera 20 starts imaging before vibration or the like is detected by the sensor 12. For example, the camera 20 continuously performs imaging until the user finishes use of the input apparatus 2000 from starting thereof. The captured image 22 generated by the camera 20 is continuously stored in a storage device or the like in a predetermined period.

On the other hand, in a case where the time point at which the signal transmitted from the device 10 is received or a time point corresponding to a predetermined time after the time point is set as the sensor timing, the camera 20 may start imaging after vibration is detected by the sensor 12. In this case, for example, the camera 20 receives a signal indicating that vibration has been detected by the sensor 12 from the device 10 or the input apparatus 2000, and starts imaging at a timing of receiving the signal.

Note that, since the camera 20 generates the captured image 22 at a discrete time interval (for example, once for 33 milliseconds), accurately, there is a case where there is no captured image 22 generated at the sensor timing. In this case, the position calculation unit 2020 calculates a position of the marker by using the captured image 22 generated right before or right after the still image.

<<Marker>>

The marker is any marker at least the position of which can be determined in the captured image 22. For example, the marker is a marker which can be used for determination of a three-dimensional coordinate system. A marker used for determination of a three-dimensional coordinate system is, for example, an augmented reality (AR) marker. However, a marker used for determination of a three-dimensional coordinate system may be a marker causing three directions orthogonal to each other from a certain reference point to be obtained in a constant manner, and is not limited to the AR marker.

In a case where the marker is attached to the user's body, the marker may be attached to any location of the user's body. For example, the marker is attached to the arm or the hand of the user.

For example, the marker is an image displayed on a display screen of a device attached to the user's arm. The device is any electronic device having a function of displaying an image on the display screen. Note that the device may be directly attached to the arm of the user, or may be attached to the arm of the user through clothes.

For example, in FIG. 2, the marker is the marker image 16 displayed on the touch panel 14 of the watch type device 10 worn on the user's wrist. The marker image 16 may be an image stored in the device 10 in advance, or may be an image stored in an external storage device of the device 10. In the latter case, the device 10 acquires the marker image 16 from the storage device, and displays the marker image.

The marker is not limited to being displayed on the device as described above. The marker may be directly drawn on the arm of the user, and may be drawn on any object present on the arm of the user. In the latter case, for example, the marker is drawn on a ring worn on the finger of the user, a wrist band worn on the wrist of the user, or a sleeve of clothes worn by the user. Note that the marker may be drawn by the hand, or may be printed.

In a case where the marker is a part of the user's body, the marker may be any part of the user's body. For example, the marker is the finger or the wrist of the user.

<Method of Calculating Position of Marker>

The position calculation unit 2020 calculates a position of the marker by detecting the marker from the acquired captured image 22. For example, the position calculation unit 2020 holds information regarding a shape, a size, a color, and the like of the marker in advance, detects the marker from the acquired captured image 22 by using the known information, and calculates a position thereof. Here, a technique of detecting a predetermined object from an image, and calculating a position of the object in the image is known, and thus details of the technique will not be described.

<Details of Input Recognition Unit 2040>

The input recognition unit 2040 recognizes input specifying a location on the captured image 22 separated from the marker on the basis of the calculated position of the marker (S108). As described above, a location specified by the input may be a point on the captured image 22, and may be a region on the captured image 22.

There are various methods of determining which one of a point and a region is recognized as input. For example, a method of determining which one of a point and a region is recognized as input is set in the position calculation unit 2020 in advance. For example, information indicating which one of a point and a region is recognized as input is stored in advance in a storage device which can be accessed from the input recognition unit 2040. For example, the input recognition unit 2040 receives an input operation of selecting which one of a point and a region is recognized as input from the user before recognizing the input. The input operation is received according to any method. For example, the input operation is performed by using the touch panel 14 of the device 10.

Figure 7A:
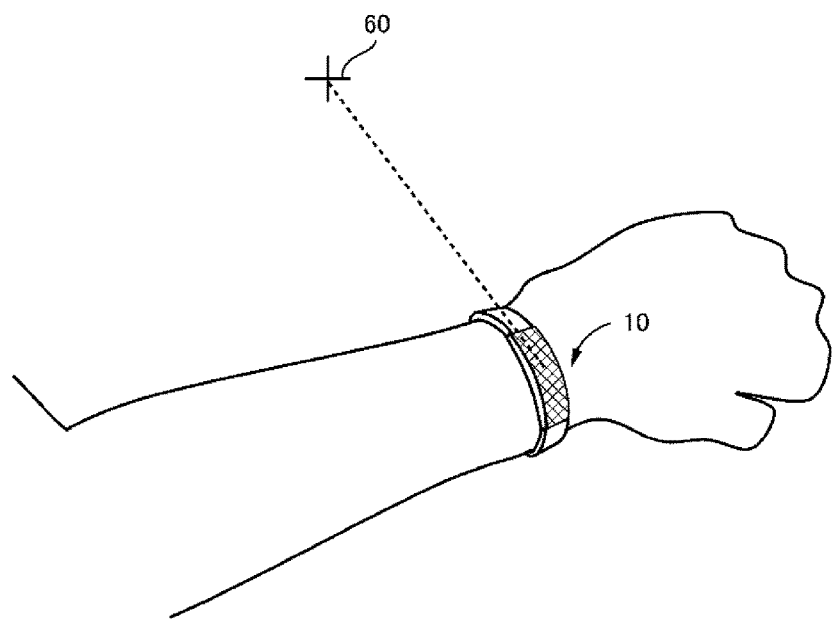
FIG. 7 are diagrams illustrating an input position.
Figure 7B:
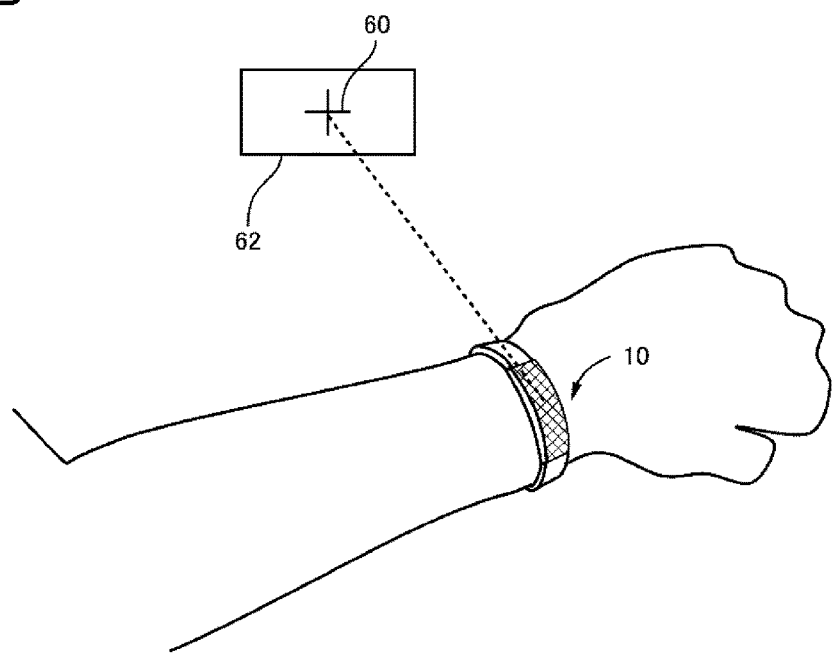

A description will be made of a method of the input recognition unit 2040 determining a location specified by input. First, the input recognition unit 2040 determines a position (hereinafter, referred to as an input position) for determining a location on the captured image 22 which is recognized as input on the basis of a calculated position of the marker. FIG. 7 are diagrams illustrating an input position. In a case where input is recognized as a point on the captured image 22, the input recognition unit 2040 recognizes an input position 60 as an input location on the captured image 22 (FIG. 7A). In a case where input is recognized as a region on the captured image 22, the input recognition unit 2040 recognizes a region 62 defined by the input position 60 as an input location on the captured image 22 (FIG. 7B).

The input position 60 is relatively defined in advance in a relationship with a position of the marker on the captured image 22. For example, a relationship between the input position and a position of the marker is defined as a two-dimensional positional relationship on a plane of the captured image 22.

Figure 8:
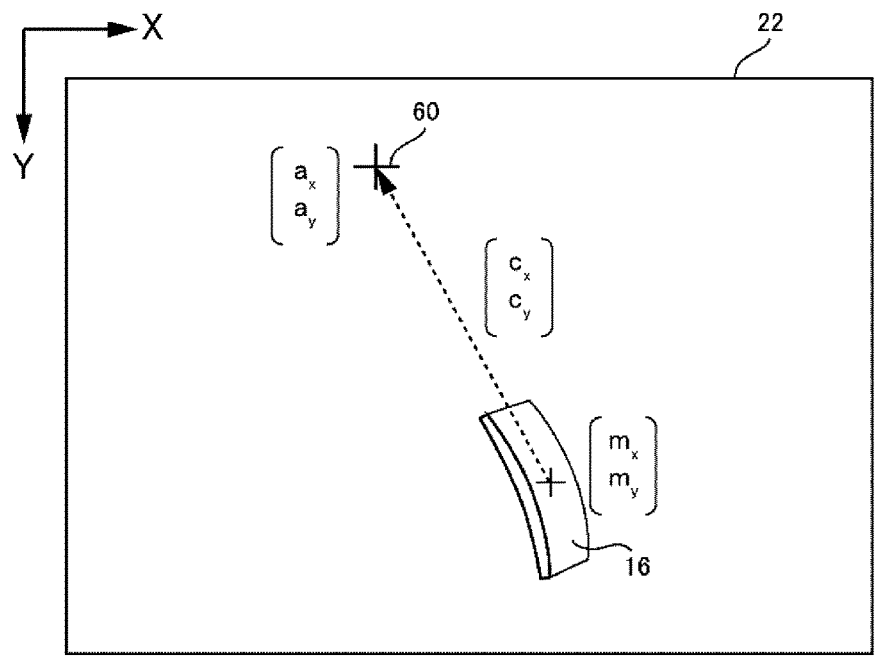
FIG. 8 is a diagram illustrating a relationship between an input position and a position of a marker on a plane of a captured image.

FIG. 8 is a diagram illustrating a relationship between the input position 60 and a position of the marker on the plane of the captured image 22. In the example illustrated in FIG. 8, a relationship between the input position 60 and a position of the marker is defined in the following Equation (1). $(a_x, a_y)$ is a coordinate of the input position 60 in the captured image 22. $(m_x, m_y)$ is a coordinate of a central position of the marker in the captured image 22. $(c_x, c_y)$ is a relative position of the input position 60 for the central position of the marker.

$$\begin{pmatrix} a_x \\ a_y \end{pmatrix} = \begin{pmatrix} m_x \\ m_y \end{pmatrix} + \begin{pmatrix} c_x \\ c_y \end{pmatrix} \quad (1)$$

For example, a position of the input position 60 is defined in advance as a relative position on a three-dimensional space for a position of the marker. This three-dimensional space is a three-dimensional space defined by the marker included in the captured image 22.

Figure 9:
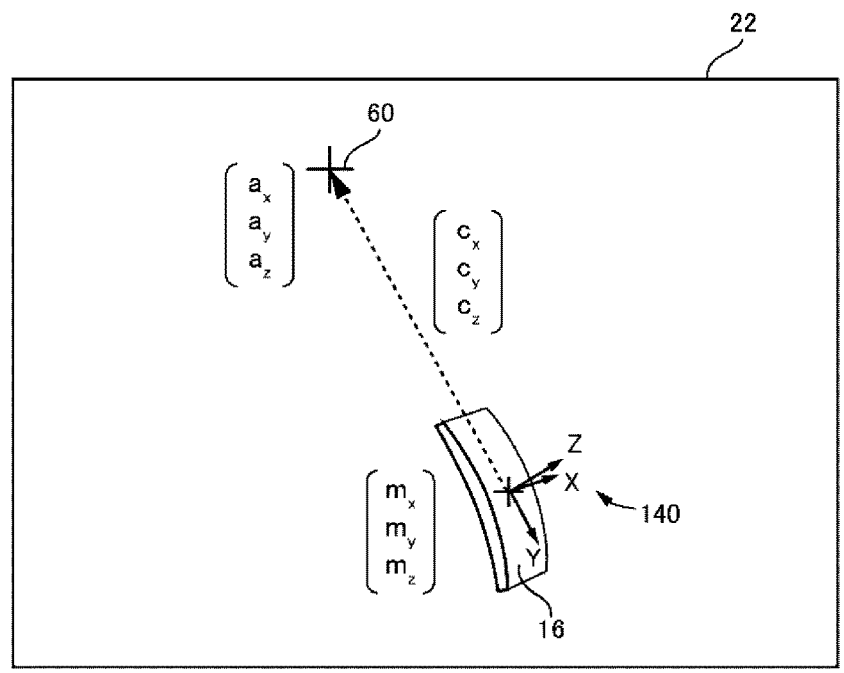
FIG. 9 is a diagram illustrating a relationship between a region 62 and a marker in a three-dimensional space.

FIG. 9 is a diagram illustrating a relationship between the region 62 and a position of the marker on a three-dimensional space. In FIG. 9, the input recognition unit 2040 calculates coordinate axes 140 by using a shape of the marker included in the captured image 22. For example, the input recognition unit 2040 handles, as the coordinate axes 140, coordinate axes having the center of the marker as the origin, a plane defined by the marker as an XY plane, and a direction orthogonal to the plane as a Z direction.

A relationship between the input position 60 and a position of the marker is defined on a three-dimensional space defined by the coordinate axes 140, for example, in the following Equation (2). $(a_x, a_y, a_z)$ is a coordinate of the input position 60 on the three-dimensional space defined by the coordinate axes 140. $(m_x, m_y, m_z)$ is a coordinate of a position of the marker on the three-dimensional space defined by the coordinate axes 140. $(c_x, c_y, c_z)$ is a relative position of the input position 60 for the central position of the marker on the three-dimensional space defined by the coordinate axes 140.

$$\begin{pmatrix} a_x \\ a_y \\ a_z \end{pmatrix} = \begin{pmatrix} m_x \\ m_y \\ m_z \end{pmatrix} + \begin{pmatrix} c_x \\ c_y \\ c_z \end{pmatrix} \quad (2)$$

As mentioned above, in a case where a relationship between the input position 60 and a position of the marker is defined as a relationship on a three-dimensional space, for example, the user performs an action (an action of turning the wrist of the left hand) of changing a posture of the device 10 in FIG. 2, and can thus change the input position 60 without moving the left arm 50 greatly.

<<Region 62 Corresponding to Input Position 60>>

A position of the region 62 is defined by the input position 60. For example, the input recognition unit 2040 handles a region the position of the center of which or one of the vertexes of which is defined by the input position 60, as the region 62.

A shape of the region 62 is any shape such as a rectangular shape or a circular shape. The region 62 may have any size. Here, there are various methods of determining a shape or a size of the region 62. For example, a shape or a size of the region 62 is set in the input recognition unit 2040 in advance.

For example, a shape or a size of the region 62 is stored in advance in a storage device which can be accessed from the input recognition unit 2040. For example, the input apparatus 2000 may receive input specifying a shape or a size of the region 62 from the user. This input is performed by using, for example, the touch panel 14 of the device 10.

Example Embodiment 2

Figure 10:
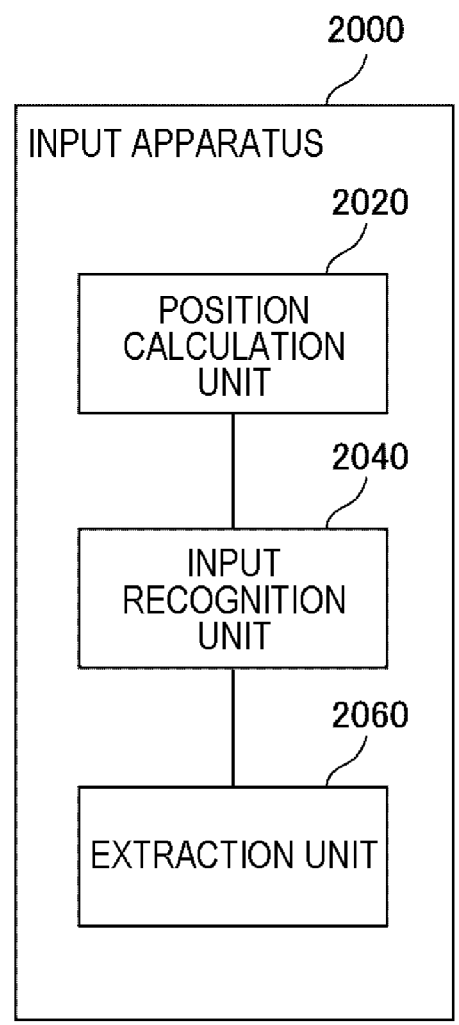
FIG. 10 is a block diagram illustrating an input apparatus according to Example Embodiment 2.

FIG. 10 is a block diagram illustrating an input apparatus 2000 according to Example Embodiment 2. In FIG. 10, each block indicates not a configuration in the hardware unit but a configuration in the functional unit. The input apparatus 2000 of Example Embodiment 2 has the same function as that of the input apparatus 2000 of Example Embodiment 1 unless particularly mentioned.

The input apparatus 2000 of Example Embodiment 2 recognizes input specifying the region 62 on the captured image 22 according to the method described in Example Embodiment 1. The input apparatus 2000 of Example Embodiment 2 extracts a partial image in the region 62 from the captured image 22.

Figure 11:
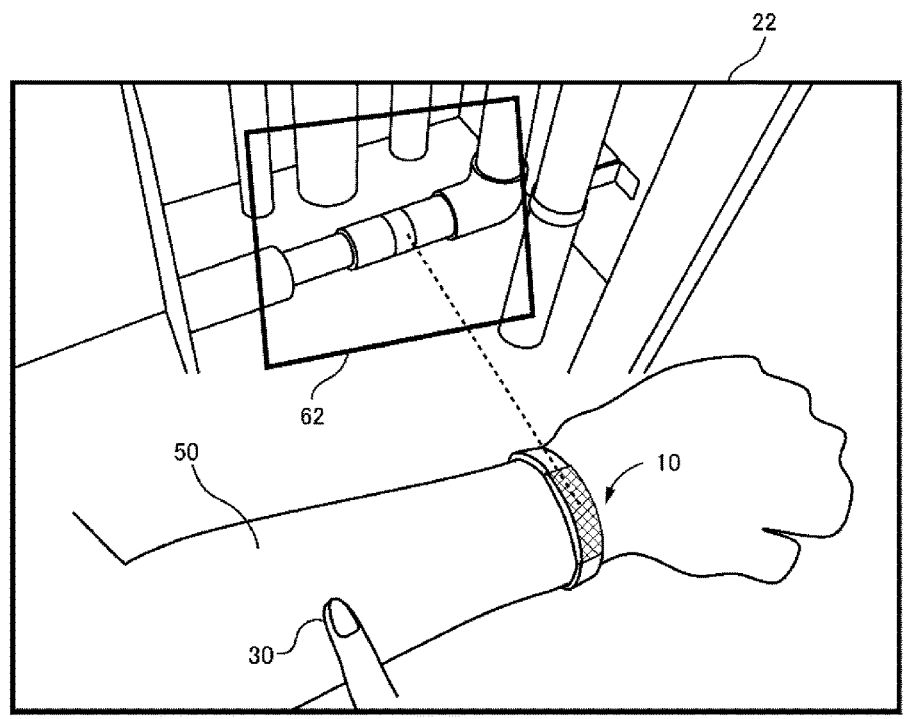
FIG. 11 is a diagram illustrating an operation of the input apparatus of Example Embodiment 2.
Figure 11:
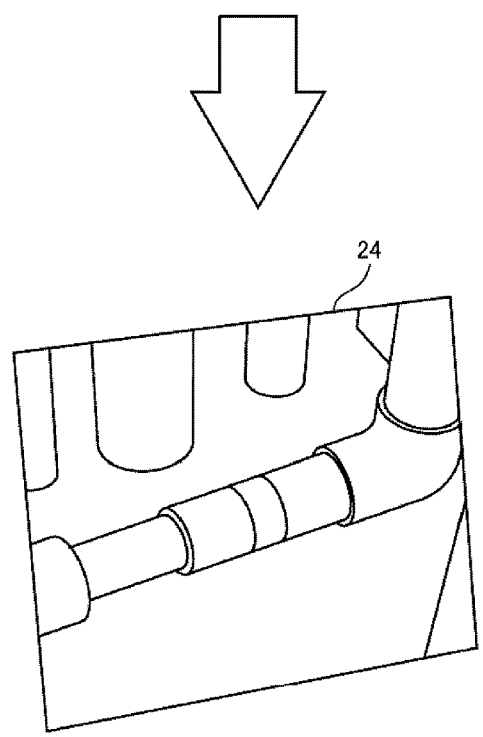

FIG. 11 is a diagram illustrating an operation of the input apparatus 2000 of Example Embodiment 2. In FIG. 11, the user inputs the region 62 by using the marker image 16 displayed on the touch panel 14 of the device 10. The input apparatus 2000 extracts a partial image 24 in the region 62 from the captured image 22.

In order to realize the operation, the input apparatus 2000 of Example Embodiment 2 further includes an extraction unit 2060. The extraction unit 2060 extracts a partial image included in the region 62 recognized by the input recognition unit 2040 from the captured image 22. Here, a technique of extracting a portion included in a predetermined range from a certain image is known, and thus a detailed description of the technique will not be repeated.

The captured image 22 used for recognition of the region 62 may be the same as the captured image 22 or may be different from the captured image 22, from which the partial image 24 is extracted. In the latter case, for example, the extraction unit 2060 extracts the partial image 24 from the latest captured image 22 at a time point at which the input recognition unit 2040 completes a process of recognizing an input operation.

<Hardware Configuration Example>

The input apparatus 2000 of Example Embodiment 2 is realized by the computer 1000 in the same manner as the input apparatus 2000 of Example Embodiment 1. The storage 1080 of the computer 1000 of Example Embodiment 2 further includes a program module for realizing each function of the input apparatus 2000.

<Advantageous Effects>

According to the input apparatus 2000 of the present embodiment, it is possible to specify a region in which a partial image is extracted from a captured image in an intuitive method to the user such as using a marker attached to the user's body. Therefore, in a case where a part of a captured image is desired to be extracted, the user can intuitively and easily specify a portion desired to be extracted. Note that extracting a partial image from a captured image has various advantages that an especially focused portion of the captured image can be preserved or displayed, or image analysis can be performed on the portion.

Example Embodiment 3

Figure 12:
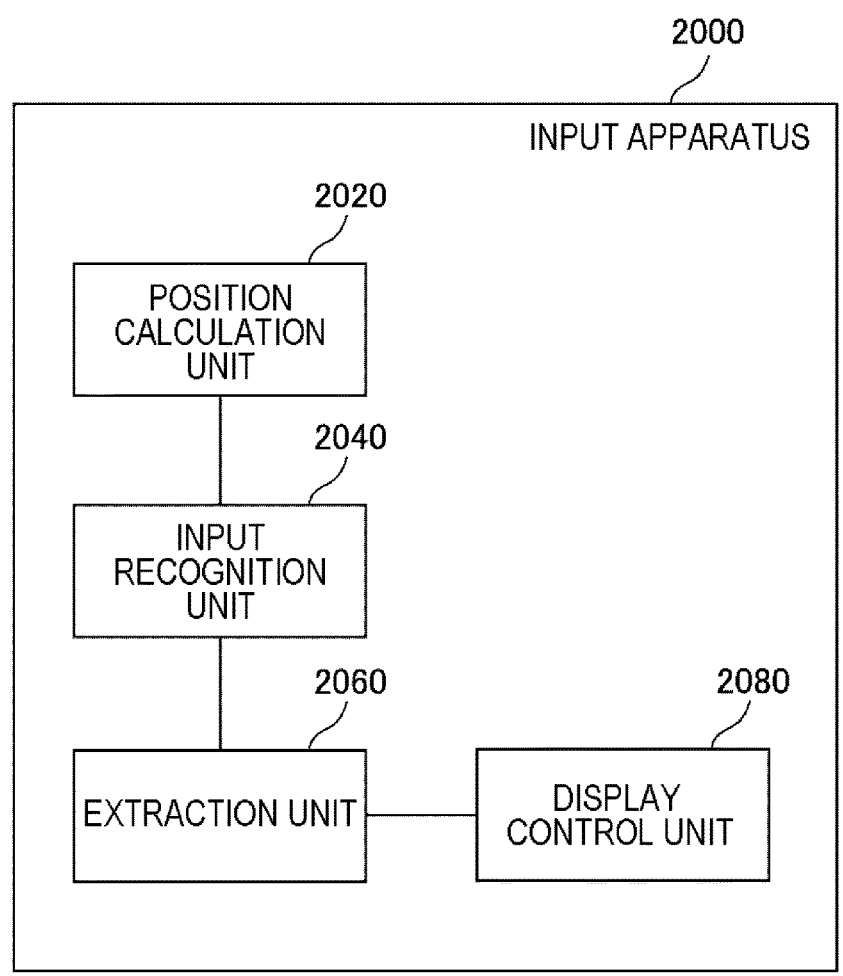
FIG. 12 is a block diagram illustrating an input apparatus according to Example Embodiment 3.

FIG. 12 is a block diagram illustrating an input apparatus 2000 according to Example Embodiment 3. In FIG. 12, each block indicates not a configuration in the hardware unit but a configuration in the functional unit. The input apparatus 2000 of Example Embodiment 3 has the same function as that of the input apparatus 2000 of Example Embodiment 2 unless particularly mentioned.

The input apparatus 2000 displays the partial image 24 on a display screen. Here, the input apparatus 2000 displays the partial image 24 on the display screen such that the partial image 24 extracted by the extraction unit 2060 overlaps scenery included in the captured image 22 or scenery similar thereto when viewed from the user's eyes. After the partial image 24 is extracted by the extraction unit 2060, the input apparatus 2000 controls display of the partial image 24 such that the partial image 24 is viewed independently from a change in the scenery included in the captured image 22.

To do so, the input apparatus 2000 of Example Embodiment 3 includes a display control unit 2080. The display control unit 2080 displays the partial image 24 extracted by the extraction unit 2060 at a predetermined position on the display screen. For example, the display control unit 2080 displays the partial image at the center of the display screen. For example, the display control unit 2080 displays the partial image 24 such that the partial image 24 stays at a position of when the partial image is extracted by the extraction unit 2060. The display control unit 2080 continuously displays the partial image 24 at the predetermined position on the display screen until a predetermined time elapses or the user performs a predetermined operation.

The predetermined time may be set in the display control unit 2080 in advance, or may be stored in a storage device which can be accessed from the display control unit 2080. The input apparatus 2000 may receive input specifying the predetermined time from the user. The predetermined operation may be any operation. For example, the predetermined operation is performed by using the touch panel 14 of the device 10.

The display control unit 2080 controls various display screens. For example, the display control unit 2080 displays the partial image 24 on a display screen (the display 172 in FIG. 4) of the head mounted display 170. For example, the display control unit 2080 displays the partial image 24 on a projection surface such as a wall onto which the captured image 22 is projected by a projector. In this case, the projection surface functions as a display screen. In addition, the display control unit 2080 displays the partial image 24 on any display screen such as a liquid crystal display.

Here, the head mounted displays 170 include those having a transmissive display as the display 172 and those having a non-transmissive display as that. In a case where the display 172 is a non-transmissive display, the head mounted display 170 displays the captured image 22 generated by the camera 20 on the display 172 in an overlapping manner with an image indicating other objects. The user views the display 172 and can thus view a scene in which other objects overlap the peripheral scenery. The display control unit 2080 of the present embodiment displays on the display 172 the captured image 22 on which the partial image 24 is superimposed, and thus allows the user to view a scene in which the partial image 24 overlaps the peripheral scenery.

In a case where the display 172 is a transmissive display, the user views both of a real object (scenery of the real world) viewed in front of the display 172 and an image displayed on the display 172, and can thus view a scene in which the image overlaps the peripheral scenery. The display control unit 2080 of the present embodiment displays the partial image 24 on the display 172 such that the user views the partial image 24. The scenery of the real world viewed by the user is scenery imaged by the camera 20 or scenery similar thereto. Therefore, the user can view a scene in which the partial image 24 overlaps the scenery included in the captured image 22 or scenery similar thereto.

In a case where a display screen is any other display screen such as a projection surface of a projector or a liquid crystal display, the display control unit 2080 displays the captured image 22 in an overlapping manner with the partial image 24 on the display screen in the same manner as in the case of the head mounted display 170 having a non-transmissive display.

In a case where the partial image 24 is displayed to stay at a position (input position 60) of when the partial image 24 is extracted by the extraction unit 2060, a method of the display control unit 2080 determining a display position of the partial image 24 differs depending on the type of display screen. In a case of using a display screen on which the captured image 22 is displayed as in a head mounted display having a non-transmissive display, the display control unit 2080 stores the input position 60 of when the partial image 24 is extracted, and displays the partial image 24 at the input position 60 in an overlapping manner with each captured image 22 which is subsequently displayed on the display screen.

On the other hand, in a case of using a display screen on which the captured image 22 is not displayed, such as a head mounted display having a transmissive display, the display control unit 2080 converts the input position 60 which is a position on the captured image 22 and at which the partial image 24 is extracted, into a position on the display screen. The display control unit 2080 displays the partial image 24 at the position on the display screen calculated through conversion.

Note that the correspondence relationship between a coordinate on the captured image 22 and a coordinate on the display screen is defined on the basis of various parameters (an angle of view or a focal length) related to the camera 20, or a positional relationship between the display screen and the camera 20. The correspondence relationship may be calculated by the display control unit 2080 by using the parameters or the like, or may be set in advance as a set value.

<Hardware Configuration Example>

Figure 13:
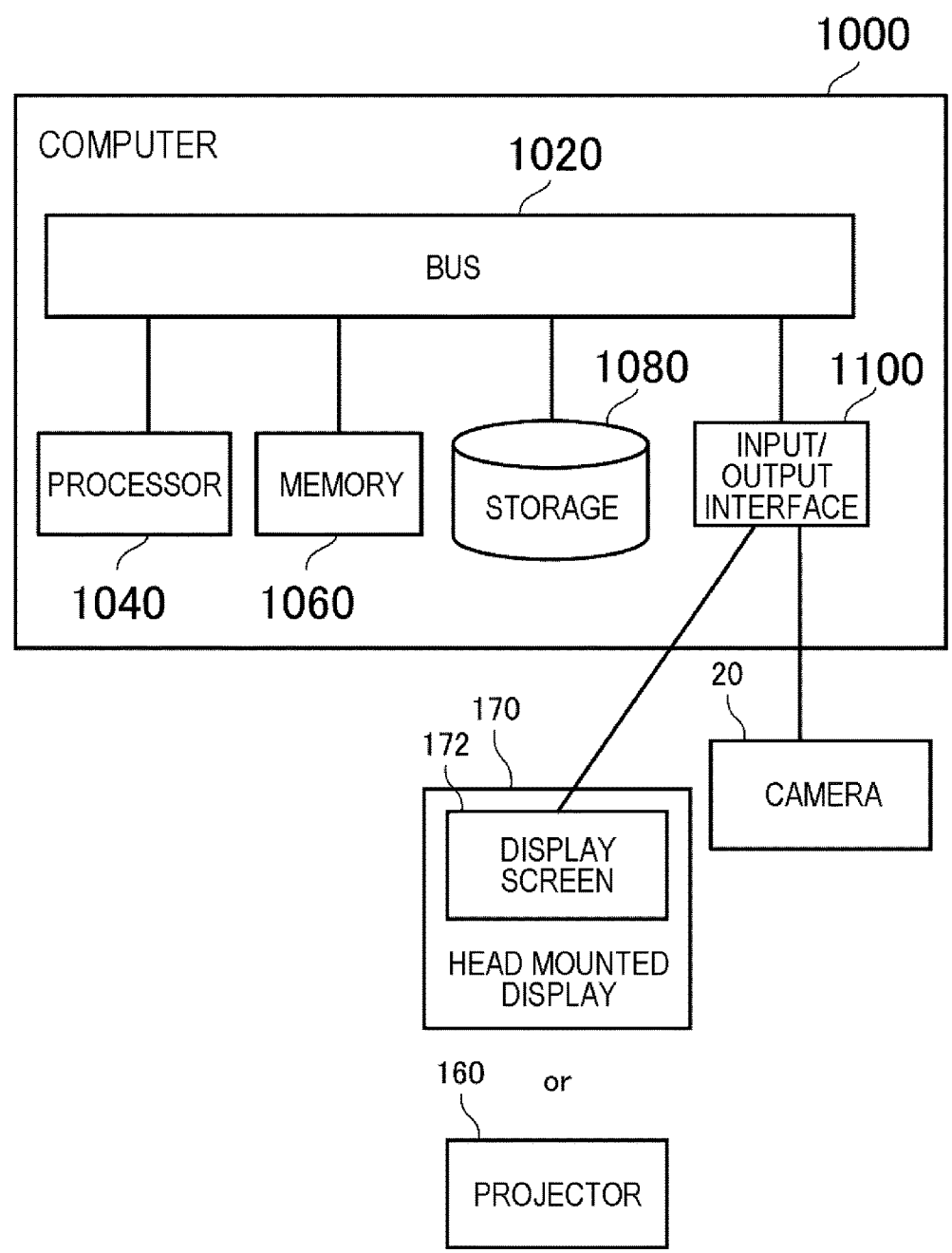
FIG. 13 is a diagram illustrating a hardware configuration of a computer realizing the input apparatus of Example Embodiment 3.

FIG. 13 is a diagram illustrating a hardware configuration of the computer 1000 realizing the input apparatus 2000 of Example Embodiment 3. A configuration of the computer 1000 is the same as the configuration of the computer 1000 realizing the input apparatus 2000 of Example Embodiment 1. However, the storage 1080 of the computer 1000 of Example Embodiment 3 further includes a program module for realizing each function of the input apparatus 2000 of the present embodiment.

An input/output interface 1100 is connected to the display 172 of the head mounted display 170 on which the partial image 24 is displayed, or a projector 160 which projects the partial image 24 onto a projection surface.

<Advantageous Effects>

Figure 14:
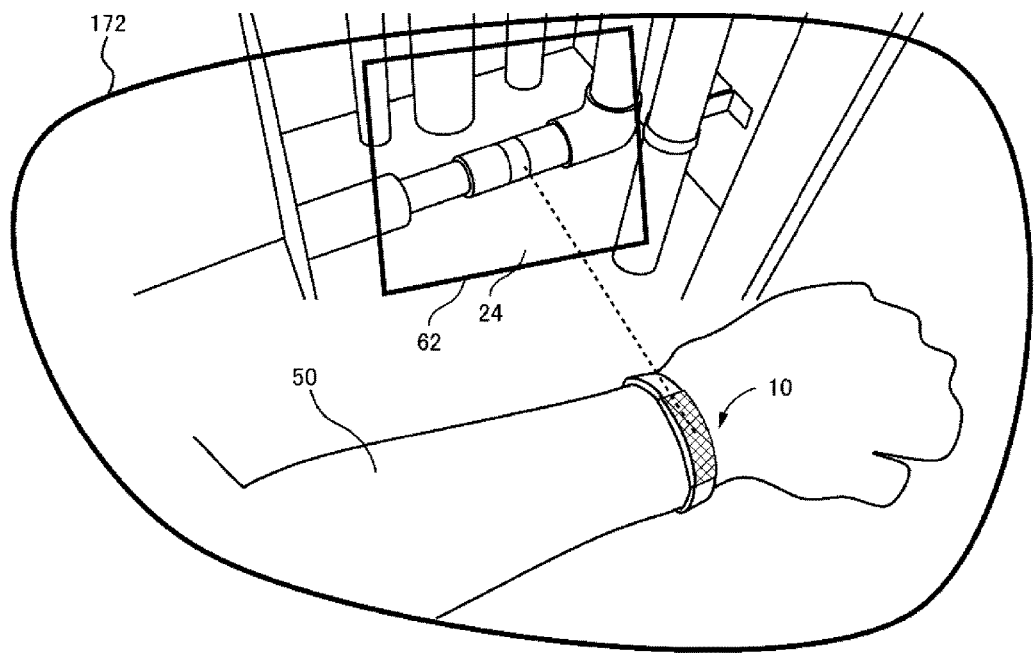
FIG. 14 are diagrams illustrating a scene in which a display position of a partial image is not changed even if a position of a marker is changed.
Figure 14:
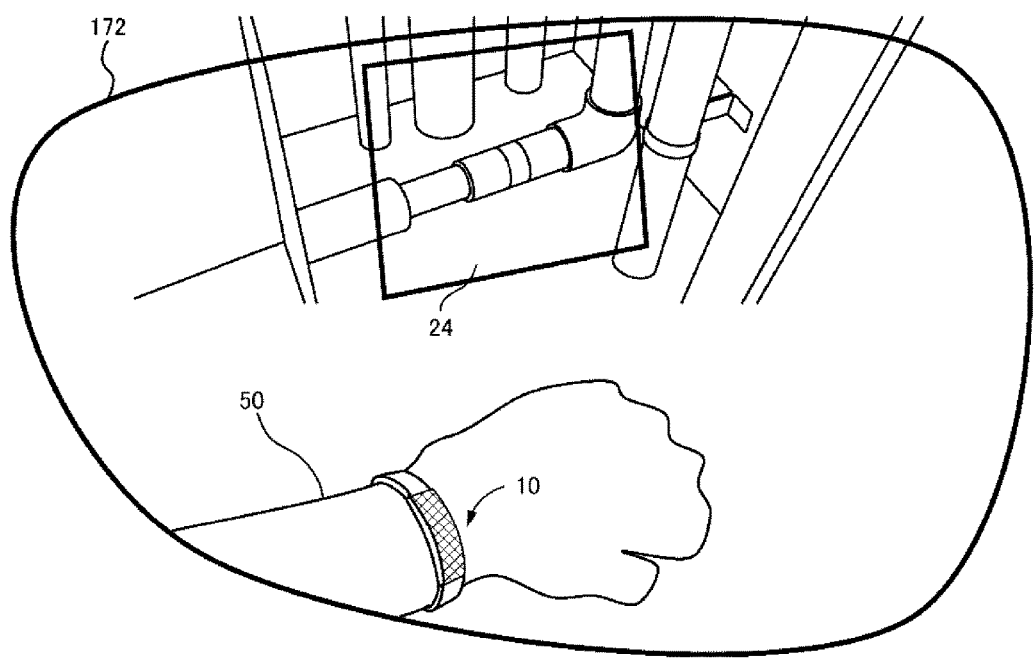

According to the input apparatus 2000 of the present embodiment, the partial image 24 extracted from the captured image 22 is fixedly displayed at a predetermined position on a display screen. Thus, even if a user moves a marker (a position of the marker included in the captured image 22 is changed), a position on a display screen at which the partial image 24 is displayed is not changed. FIG. 14 are diagrams illustrating a scene in which a display position of the partial image 24 is not changed even if a position of a marker is changed. FIG. 14A illustrates a scene before the marker is moved, and FIG. 14B illustrates a scene after the marker is moved.

As mentioned above, a user can move the marker in a state in which the partial image 24 is displayed at a fixed position on a display screen. Therefore, for example, the user can perform a new input operation to be recognized by the input recognition unit 2040 in a state in which the partial image 24 is displayed at a fixed position. Thus, a degree of freedom of an input operation performed by the user is improved.

Figure 15A:
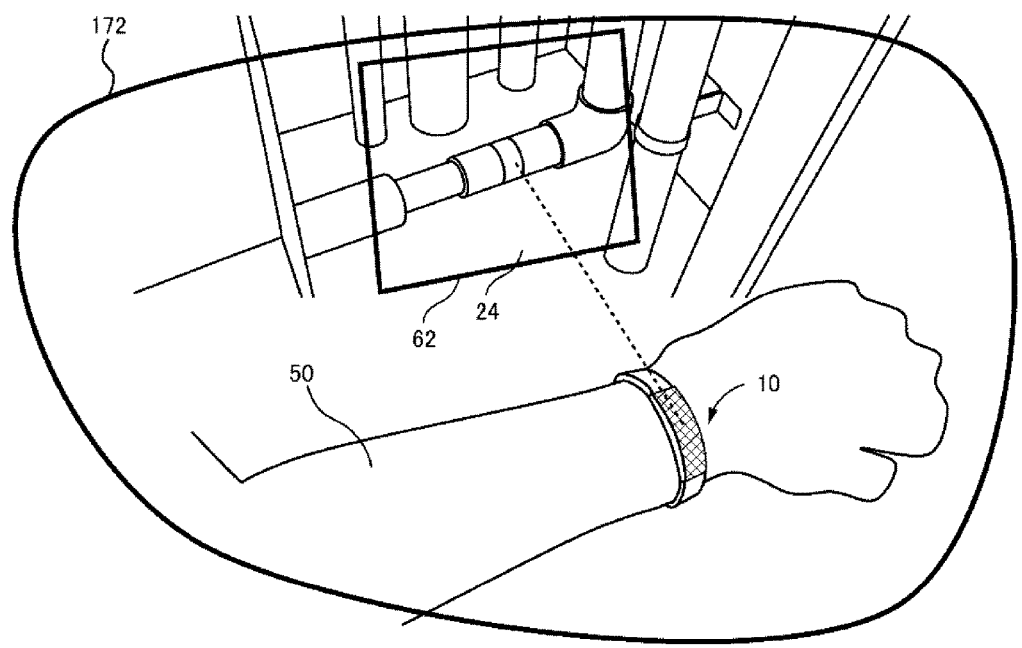
FIG. 15 are diagrams illustrating a scene in which a display position of a partial image is not changed even if an imaging range of a camera is changed.
Figure 15B:
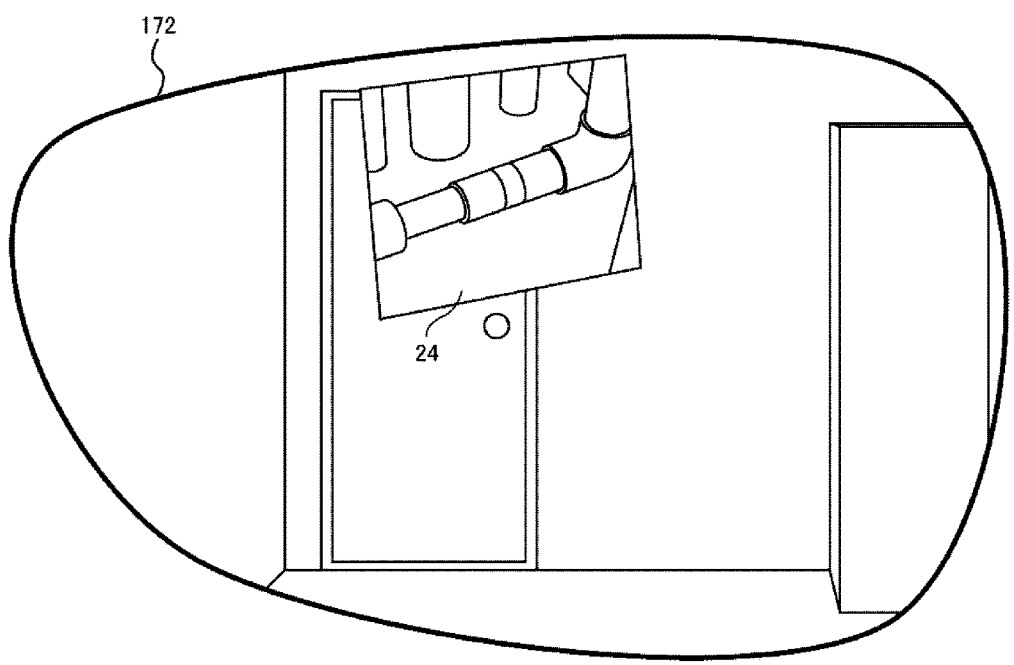

Similarly, a position on a display screen at which the partial image 24 is displayed is not changed even if an imaging range of the camera 20 is changed. FIG. 15 are diagrams illustrating a scene in which a display position of the partial image 24 is not changed even if an imaging range of the camera 20 is changed. FIG. 15A illustrates the captured image 22 generated by the camera 20 when the partial image 24 is extracted, and FIG. 15B illustrates the captured image 22 generated by the camera 20 the imaging range of which is changed thereafter.

As mentioned above, the user change an imaging range of the camera 20 in a state in which the partial image 24 is displayed at a fixed position on a display screen. For example, in a case where the user uses the head mounted display 170, the user can change a viewing direction in a state in which the partial image 24 is displayed at a fixed position. Therefore, the user's convenience of the input apparatus 2000 is improved.

Example Embodiment 4

Figure 16:
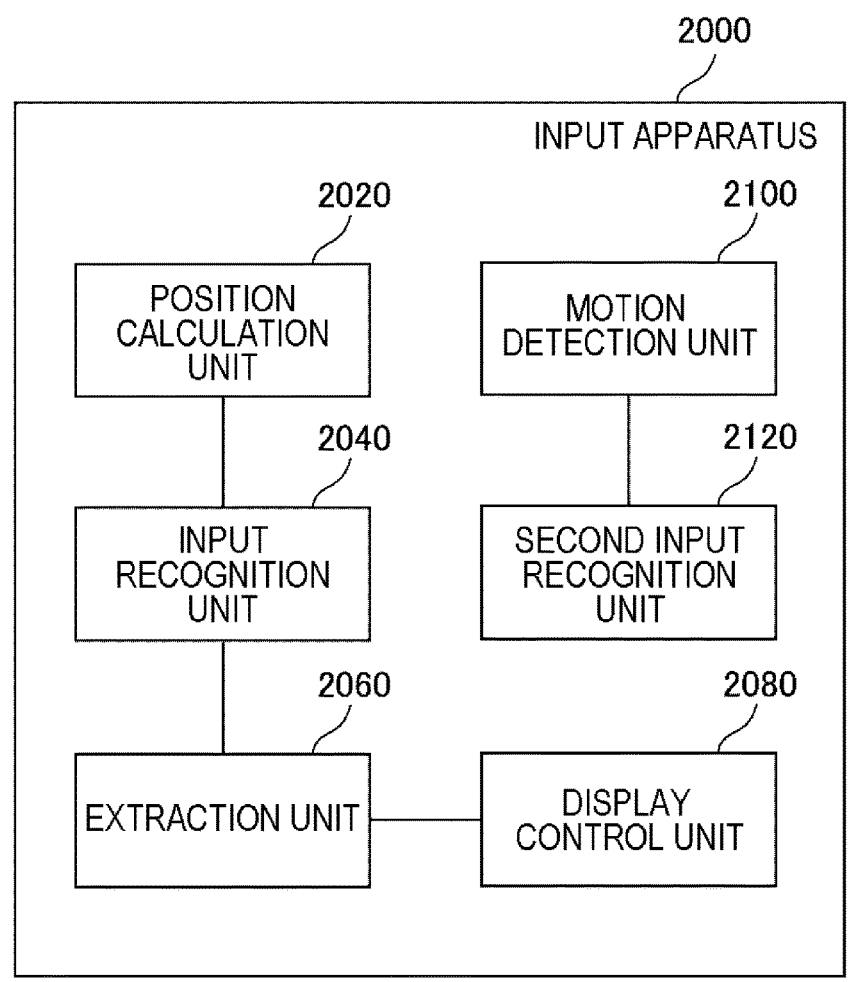
FIG. 16 is a block diagram illustrating an input apparatus according to Example Embodiment 4.

FIG. 16 is a block diagram illustrating an input apparatus 2000 according to Example Embodiment 4. In FIG. 16, each block indicates not a configuration in the hardware unit but a configuration in the functional unit. The input apparatus 2000 of the present embodiment has the same function as that of the input apparatus 2000 of Example Embodiment 3 unless particularly mentioned.

Figure 17:
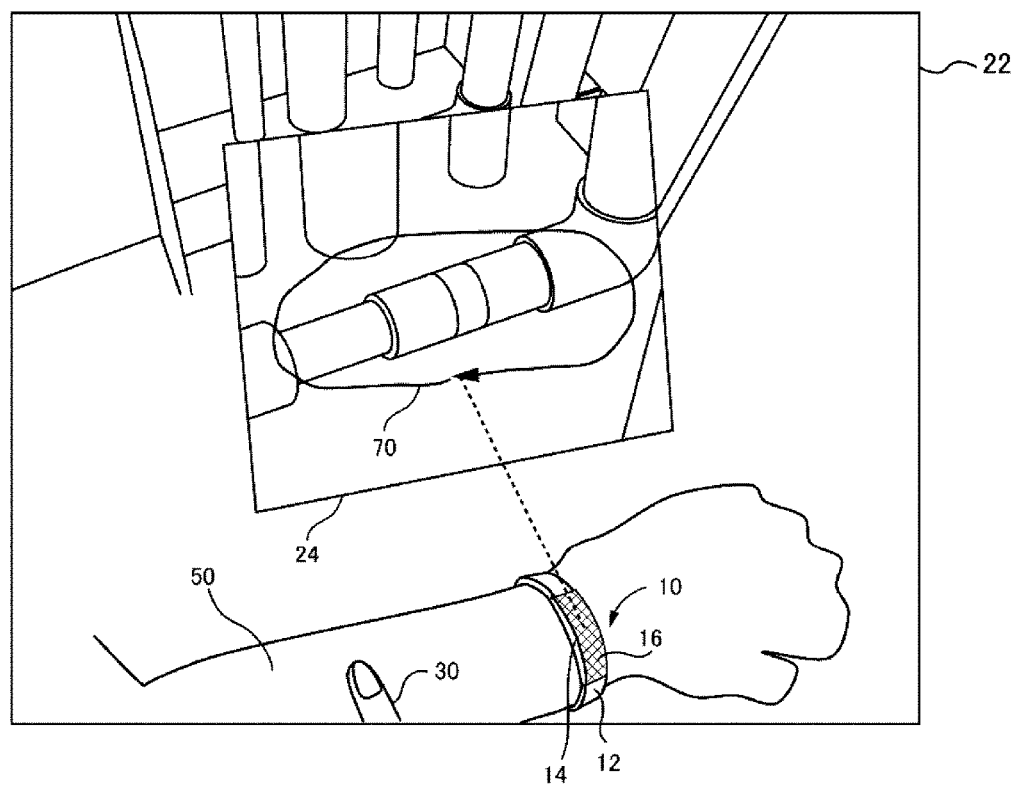
FIG. 17 is a diagram illustrating an input operation performed by a user.

The input apparatus 2000 of Example Embodiment 4 recognizes an input operation performed by the user on the basis of motion of a marker included in the captured image 22. FIG. 17 is a diagram illustrating an input operation performed by the user. In FIG. 17, the user moves the marker so as to draw a line 70 on the partial image 24. The line 70 is a line for emphasizing an especially focused portion in a scene included in the partial image 24. Note that input performed by the user is not limited to input to the partial image 24.

In order to realize the function, the input apparatus 2000 further includes a motion detection unit 2100 and a second input recognition unit 2120. The motion detection unit 2100 detects motion of a marker included in the captured image 22. Here, the detected motion of the marker is motion of the marker during time including a timing based on a result of detection by a sensor attached to the body of the user using the input apparatus 2000. The second input recognition unit 2120 recognizes input on the basis of the detected motion of the marker. This input may be input performed on the input apparatus 2000, or may be input performed on other apparatuses. Note that, the sensor may be a sensor used by the position calculation unit 2020, or may be other sensors.

<Details of Motion Detection Unit 2100>

The motion detection unit 2100 acquires a result of detection by the sensor 12. A method of the motion detection unit 2100 recognizing a result of detection by the sensor 12 is the same as the method of the position calculation unit 2020 recognizing a result of detection by the sensor.

The motion detection unit 2100 detects motion of the marker in a period defined on the basis of the result of detection by the sensor 12. Hereinafter, the "period on the basis of the result of detection by the sensor 12" will be referred to as a detection target period.

The motion detection unit 2100 defines the detection target period by using one or two sensor timings described in Example Embodiment 1. In a case where the detection target period is defined by using a single sensor timing, the motion detection unit 2100 defines both a start point and an end point of the detection target period by using the single sensor timing.

In a case where the detection target period is defined by using two sensor timings, the motion detection unit 2100 determines a start point of the detection target period by using an earlier sensor timing of the two sensor timings, and determines an end point of the detection target period by using a later sensor timing.

Figure 18A:
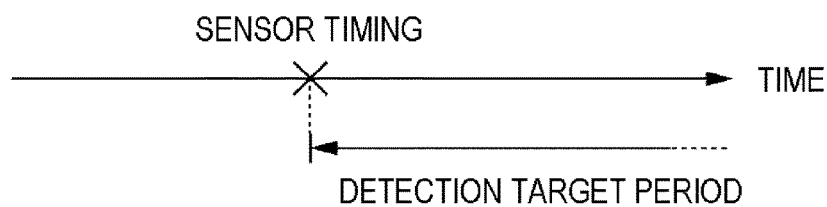
FIG. 18 are diagrams illustrating a method of determining a start point of a detection target time by using a sensor timing.
Figure 18B:
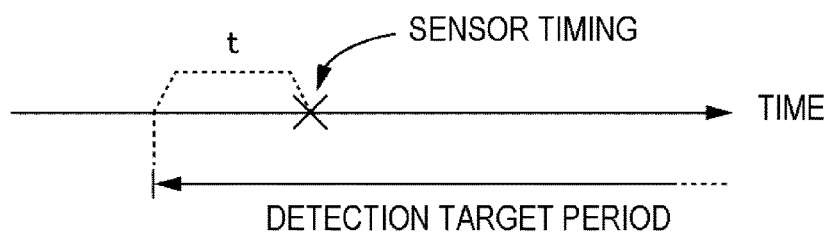
Figure 18C:
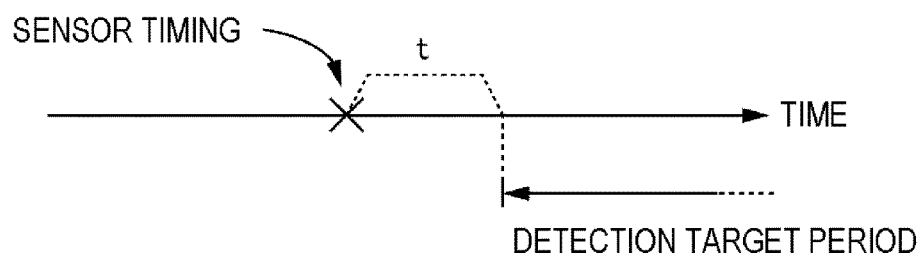

FIG. 18 are diagrams illustrating a method of determining a start point of the detection target period by using a sensor timing. For example, the motion detection unit 2100 handles a sensor timing as a start point of the detection target period (FIG. 18A). For example, the motion detection unit 2100 handles a time point corresponding to a predetermined time before the sensor timing as a start point of the detection target period (FIG. 18B). For example, the motion detection unit 2100 handles a time point corresponding to a predetermined time after the sensor timing as a start point of the detection target period (FIG. 18C).

A method of determining an end point of the detection target period by using a sensor timing is the same as the method of determining a start point of the detection target period by using a sensor timing.

Note that, information indicating the predetermined time may be set the motion detection unit 2100 in advance, or may be stored in a storage device which can be accessed from the motion detection unit 2100. A predetermined time used to determine a start point of the detection target period may be the same as or different from a predetermined time used to determine an end point of the detection target period.

The motion detection unit 2100 detects motion of the marker by using the captured image 22 generated in the detection target period. In a case where there are a plurality of captured images 22 generated in the detection target period, for example, the motion detection unit 2100 recognizes the marker from each of the plurality of captured images 22, and calculates a position of the marker included in each captured image 22. The motion detection unit 2100 uses information indicating a change in a position of the marker as information indicating motion of the marker. The information indicating a change in a position of the marker is, for example, information in which positions of the marker are arranged in a time series.

It may be a single captured image 22 that is generated in the detection target period. In a case where the marker is being moved, the blurring marker is frequently included in a single captured image 22. Therefore, the motion detection unit 2100 calculates motion of the marker from the single captured image 22 including the blurring marker.

Figure 19:
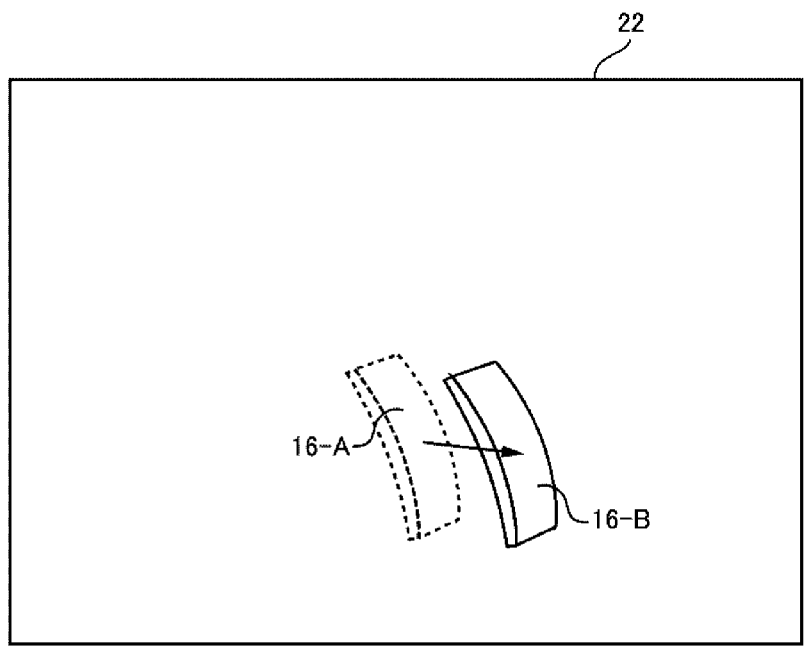
FIG. 19 is a diagram illustrating a captured image including a blurring marker.

FIG. 19 is a diagram illustrating a captured image 22 including the blurring marker. In the captured image 22, the marker image 16 is blurred so that it moves from a marker image 16-A to a marker image 16-B. The motion detection unit 2100 detects changes in position of a feature point (for example, the center of four corners of the marker image 16) common to the marker image 16-A and the marker image 16-B as motion of the marker.

<Details of Second Input Recognition Unit 2120>

The second input recognition unit 2120 recognizes input on the basis of the detected motion of the marker. The second input recognition unit 2120 1) may recognize a shape based on the detected motion of the marker as the input, or 2) may recognize a predetermined input operation corresponding to the detected motion of the marker as the input.

<<Case where Shape Based on Motion of Marker is Recognized as Input>>

Figure 20A:
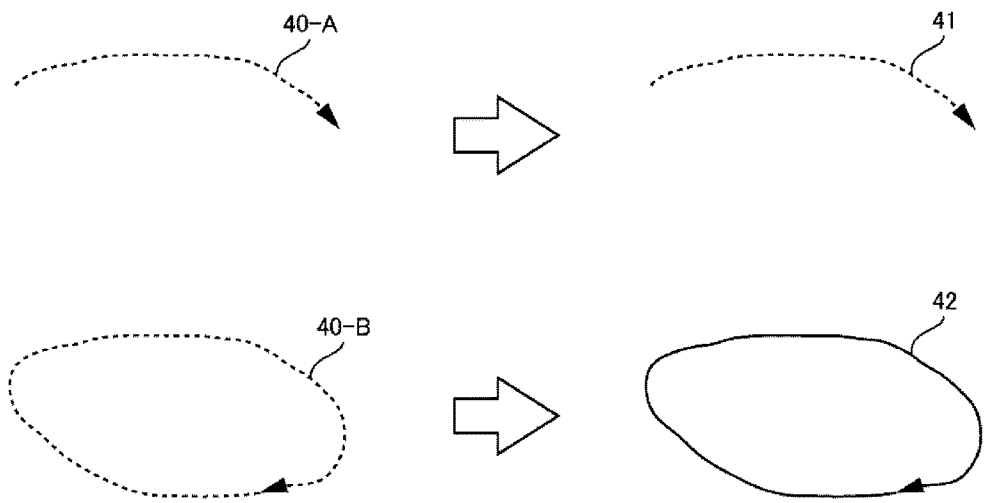
FIG. 20 are diagrams illustrating a scene in which a shape defined by motion of a marker is recognized as input.

FIG. 20 are diagrams illustrating a scene in which a shape defined by motion 40 of the marker is recognized as input. In FIG. 20A, the second input recognition unit 2120 recognizes a shape 41 indicated by motion 40-A of the marker or a shape 42 indicated by motion 40-B as input. For example, this input is used for the user to perform handwriting.

Figure 20B:
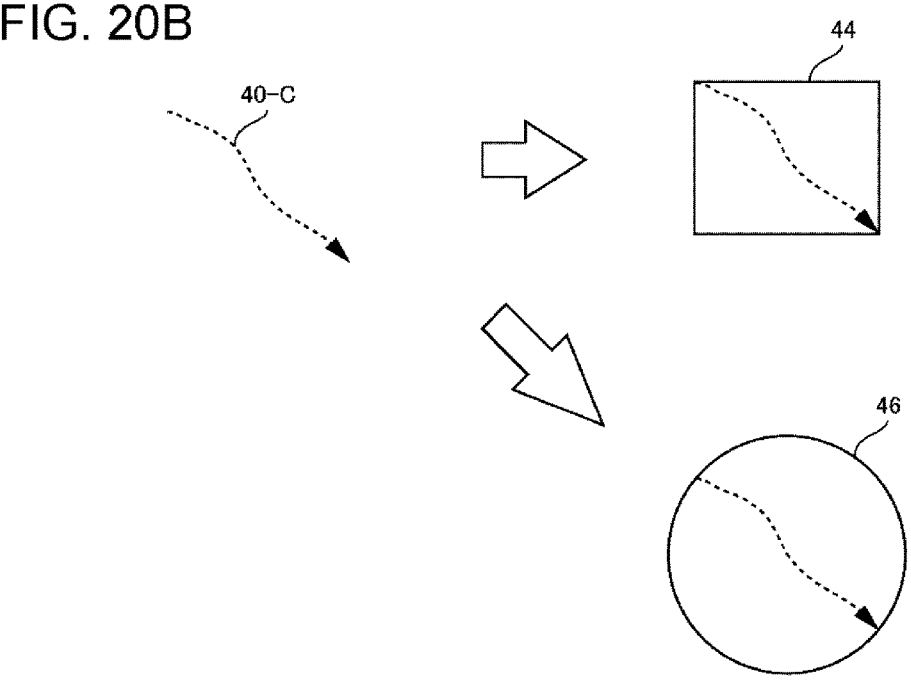

In FIG. 20B, the second input recognition unit 2120 recognizes as input a shape which is different from motion of the marker but the shape and size of which are defined by motion of the marker. Specifically, the second input recognition unit 2120 recognizes as input a rectangular shape 44, a diagonal line of which is both ends of motion 40-C, or a circular shape 46, a diameter of which is both ends of motion 40-C. For example, this input is used for the user to perform input (a selection operation or the like) indicating a certain range or to draw a predetermined graphic.

Which one of the method illustrated in FIG. 20A and the method illustrated in FIG. 20B is used may be fixed, or may be set by the user. Information indicating which one of the methods is used may be set in the second input recognition unit 2120 in advance, or may be stored in a storage device which can be accessed from the second input recognition unit 2120.

<<Case where Predetermined Input Operation Corresponding to Motion of Marker is Recognized>>

Figure 21A:
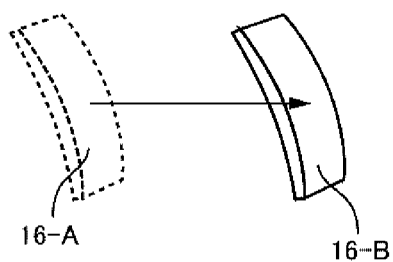
FIG. 21 are diagrams illustrating gesture input.
Figure 21B:
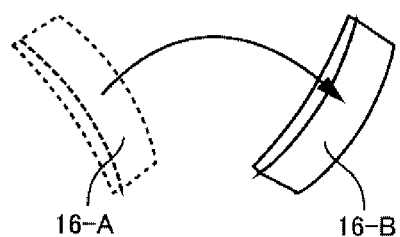

A predetermined input operation corresponding to detected motion of the marker is an input operation based on so-called gesture input. FIG. 21 are diagrams illustrating gesture input. FIG. 21A illustrates a flick action, and FIG. 21B illustrates a rotation action.

Information in which motion of the marker is correlated with a predetermined input operation corresponding to the motion may be set in the second input recognition unit 2120 in advance, or may be stored in an internal or external storage device of the input apparatus 2000 in advance.

<Handling of Location where Action of Moving Marker is Performed>

The second input recognition unit 2120 1) may recognize only motion of the marker as input regardless of a position where an action of moving the marker is performed, or 2) may recognize a combination of motion of the marker and a position where an action of moving the marker is performed as input. In the former case, even if an action of moving the marker is performed at any location on the captured image 22, the same motion of the marker indicates the same input. On the other hand, in the latter case, a location where an action of moving the marker is performed on the captured image 22 has a meaning.

For example, it is assumed that the user performs a drawing operation on an object included in the captured image 22 or an object (partial image 24 or the like) displayed on a display screen. In this case, not only a drawn shape but also a drawing target has a meaning. For example, the input operation illustrated in FIG. 17 is an operation of drawing the line 70 surrounding a rust portion of a pipe included in the partial image 24. Thus, the second input recognition unit 2120 is required to recognize as input not only a shape of the line 70 but also a location where the line 70 is drawn.

In a case of 1), as described above, the second input recognition unit 2120 recognizes a shape defined by motion of the marker detected by the motion detection unit 2100 or a gesture defined by motion of the marker as input.

On the other hand, in a case of 2), the second input recognition unit 2120 recognizes input on the basis of transition in a coordinate of the marker on the captured image 22, detected by the motion detection unit 2100. In a case of FIG. 17, the second input recognition unit 2120 recognizes transition in a coordinate of the marker on the captured image 22 as input. Therefore, the second input recognition unit 2120 recognizes not only the shape of the line 70 but also the position where the line 70 is drawn, as input.

In the case of 2), as a location in which the user performs input, the second input recognition unit 2120 may recognize not a location where an action related to the marker is performed, but a location separated from the location. This is the same as the input recognition unit 2040 recognizing a location separated from a position of the marker as input. In FIG. 17 described above, input is performed by moving the marker with a position separated from the marker as a target.

In a case of recognizing input related to a location separated from the marker on the basis of motion of the marker, the second input recognition unit 2120 converts transition in a coordinate of the marker on the captured image 22, detected by the motion detection unit 2100, into transition in a coordinate of the location separated from the marker according to a predetermined method.

For example, the second input recognition unit 2120 uses a relationship between a position of the marker and the input position 60 described by using Equation (1). Specifically, the second input recognition unit 2120 converts each position of the marker on a plurality of captured images 22 into the input position 60 by using Equation (1). The second input recognition unit 2120 recognizes information in which a plurality of calculated coordinates of the input position 60 are arranged in a time series, as input.

Similarly, the second input recognition unit 2120 may convert each position of the marker on a plurality of captured images 22 into the input position 60 by using relationship between a position of the marker and the input position 60 described by using Equation (2).

A method of 1) and 2) in which the second input recognition unit 2120 recognizes input may be set in the second input recognition unit 2120 in advance, may be stored in a storage device which can be accessed from the second input recognition unit 2120, or may be selected by the user.

<Method of Changing Input Recognition Unit 2040 and Second Input Recognition Unit 2120>

The input apparatus 2000 of Example Embodiment 4 recognizes the user's input according to one of the input recognition unit 2040 and the second input recognition unit 2120. There are various methods of the input apparatus 2000 determining which one of the input recognition unit 2040 and the second input recognition unit 2120 is used to recognize the user's input.

For example, the input apparatus 2000 receives an operation of selecting which one of the input recognition unit 2040 and the second input recognition unit 2120 is used to recognize input, from the user. For example, the input apparatus 2000 may recognize input with the second input recognition unit 2120 while the partial image 24 extracted by the extraction unit 2060 is displayed on a display screen by the display control unit 2080. In the above-described way, the line 70 can be drawn on the partial image 24 without the user performing an operation of selecting an input method.

<Advantageous Effects>

According to the present embodiment, the user can perform an input operation (an input operation recognized by the second input recognition unit 2120) using motion of the marker in addition to an input operation (an input operation recognized by the input recognition unit 2040) specifying a location separated from the marker. Therefore, a variation in an input operation performed by the user is increased, and thus the convenience of the input apparatus 2000 is improved.

Example

Hereinafter, the input apparatus 2000 will be described by using a more specific Example. Note that this Example is an example of a usage method for the input apparatus 2000, and does not limit a usage method for the input apparatus 2000.

Figure 22:
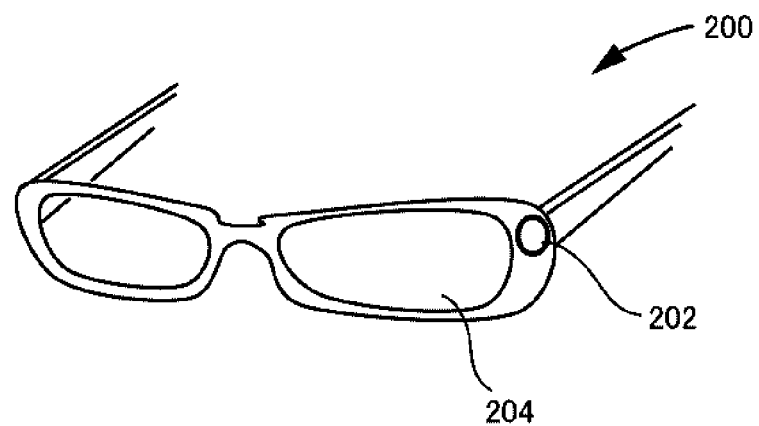
FIG. 22 is a diagram illustrating glasses and a watch.
Figure 22:
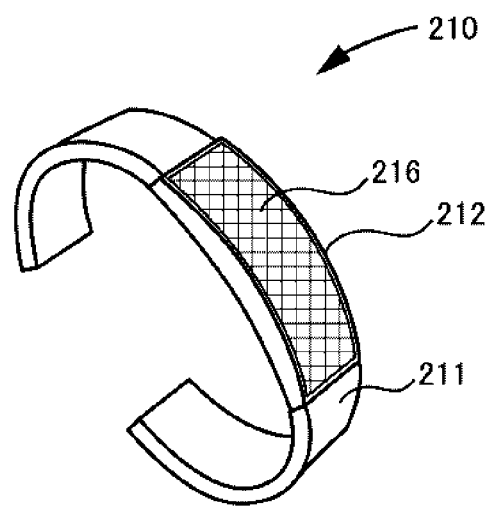

In the present example, two devices such as glasses 200 and a watch 210 are used for an operation of the input apparatus 2000. FIG. 22 is a diagram illustrating the glasses 200 and the watch 210.

The glasses 200 are a head mounted display provided with a camera 202. In the present example, the input apparatus 2000 is built into the glasses 200. The user wears the glasses 200 such as spectacles.

The camera 202 is a video camera, and corresponds to the camera 20 in each of the above-described example embodiments. The display 204 is a transmissive display having a lens shape. The glasses 200 display various pieces of information on the display 204. Consequently, the user views the various pieces of information overlapping scenery of the real world with the eyes thereof.

The watch 210 has a vibration sensor 211 built thereinto. The watch 210 has a touch panel 212. The watch 210, the vibration sensor 211, and the touch panel 212 respectively correspond to the device 10, the sensor 12, and the touch panel 14 in Example Embodiment 1. The touch panel 212 displays a marker image 216.

The glasses 200 and the watch 210 form an input system which functions as an input interface for an information processing apparatus. An information processing apparatus which is an operation target of the input system may be the glasses 200, the watch 210, or other computers. In the present example, an operation target information processing apparatus is assumed to be the glasses 200.

Figure 23:
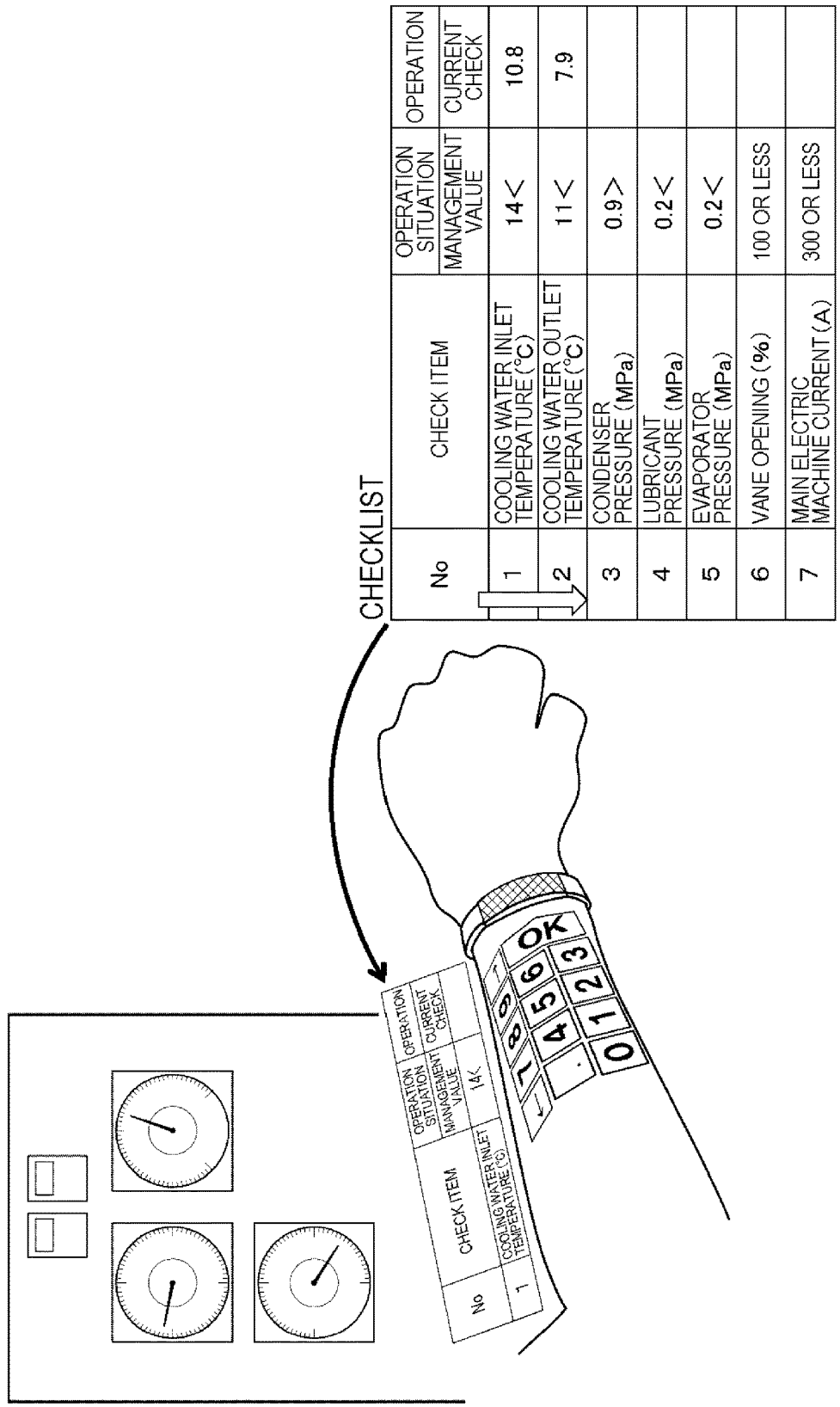
FIG. 23 is a diagram illustrating a summary of checking work performed by a user.

In the present example, the user performs checking work on an instrument by using the glasses 200 and the watch 210. FIG. 23 is a diagram illustrating a summary of checking work performed by the user. The user performs reading work on a meter indicating a state of each instrument, or records a memo or takes a picture with respect to a portion of the instrument to be concerned by the user, according to a checklist.

An input operation on the glasses 200 is roughly classified into three operations. A first input operation is an input operation specifying a location separated from the marker image 216 included in an imaging range of the camera 202. This operation is an input operation described in Example Embodiments 1 to 3. A state in which the glasses 200 receive this operation is referred to as a first input mode.

A second input operation is an input operation performed by moving a predetermined object within an imaging range of the camera 202. This operation is an input operation described in Example Embodiment 4. However, the input apparatus 2000 of the present example is not limited to motion of the marker image 216, and motion of various objects such as the finger of the user as input. A state in which the glasses 200 receive this operation is referred to as a second input mode.

A third input operation is an input operation performed by performing an operation on an operation image displayed on the display 204. A state in which the glasses 200 receive this operation is referred to as a third input mode. Note that the specific content of an operation in the third input mode will be described later.

Figure 24:
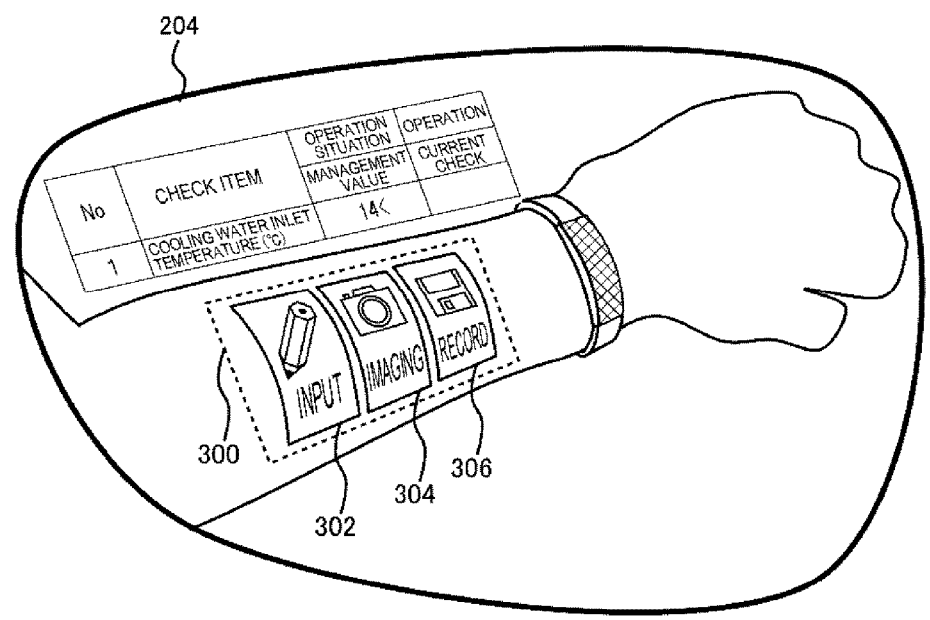
FIG. 24 is a diagram illustrating an operation selection menu included in a view of the user.

If the user starts checking work, the glasses 200 displays a first item of the checklist and an operation selection menu 300 on the display 204. FIG. 24 is a diagram illustrating the operation selection menu 300 included in a view of the user. The operation selection menu 300 includes three operation images such as an input button 302, an imaging button 304, and a record button 306. Here, the glasses 200 display this item such that the first item of the checklist is viewed around the left arm 50 mounted to which the watch 210 is attached when viewed from the user's eyes. The glasses 200 display the operation selection menu such that the operation selection menu is viewed on the left arm 50 to which the watch 210 is attached when viewed from the user's eyes.

The user performs an operation of selecting an operation image. Specifically, the user performs an operation of tapping an operation image to be selected. Then, the watch 210 detecting vibration of the tapping changes a marker image displayed on the touch panel 212. Next, the glasses 200 detect that the image displayed on the touch panel 212 has been changed, and thus performs a process of recognizing input.

A state of the glasses 200 of when the operation selection menu 300 is displayed is the third input mode in which selection of the operation image is received. Thus, the glasses 200 determine which operation image is selected by the user as a result of detecting that the image displayed on the touch panel 212 has been changed. Specifically, the glasses 200 detect a position of the user's finger from the captured image 22 generated by the camera 202, and determine which position of an operation image included in the operation selection menu 300 corresponds to that position.

Figure 25:
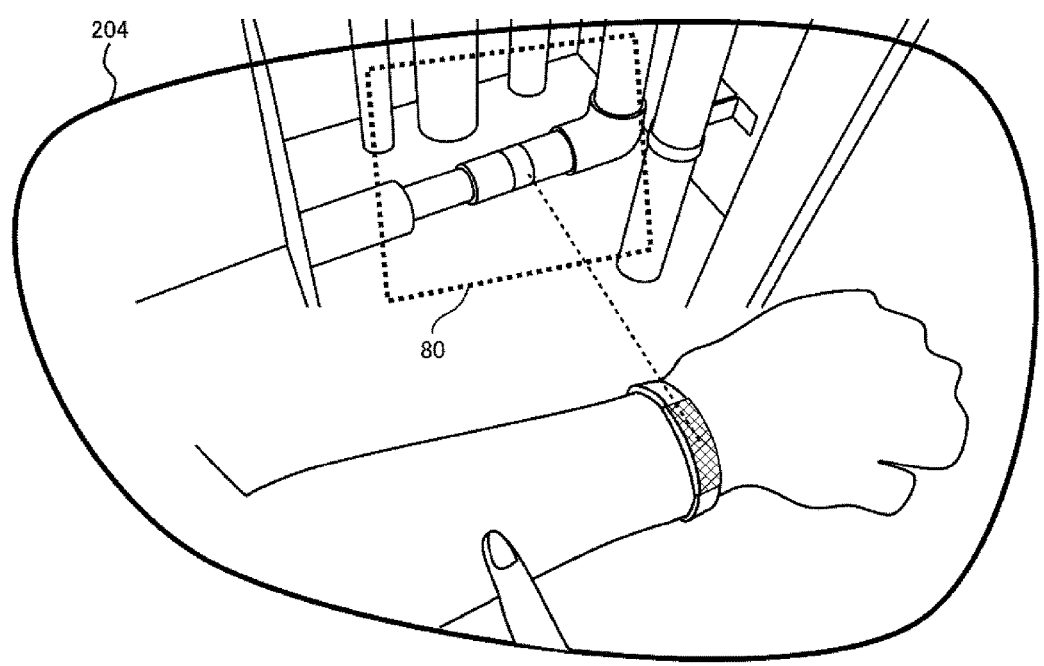
FIG. 25 is a diagram illustrating a guide included in the view of the user.

In a case where the user selects the imaging button 304 from the operation selection menu 300, the glasses 200 display a guide indicating an imaging range on the display 204. FIG. 25 is a diagram illustrating a guide 80 included in a view of the user. The guide 80 represents the partial image 24 (the region 62 recognized by the input recognition unit 2040) extracted by the display control unit 2080 in a case where the user performs input to the input apparatus 2000. The guide 80 is displayed, and thus the user can visually recognize a portion extracted as the partial image 24 before the partial image 24 is extracted.

The user moves the device 10 such that the guide 80 is displayed at a location desired to be saved as an image. Thereafter, the user taps the left arm 50 so as to perform input to the input apparatus 2000. Here, after the imaging button 304 is pressed, a state of the input apparatus 2000 transitions to the second mode in which the input recognition unit 2040 receives an input operation. Therefore, the input recognition unit 2040 recognizes the region 62 as a result of the user tapping the left arm 50. The display control unit 2080 extracts the partial image 24 by using the region 62.

Figure 26:
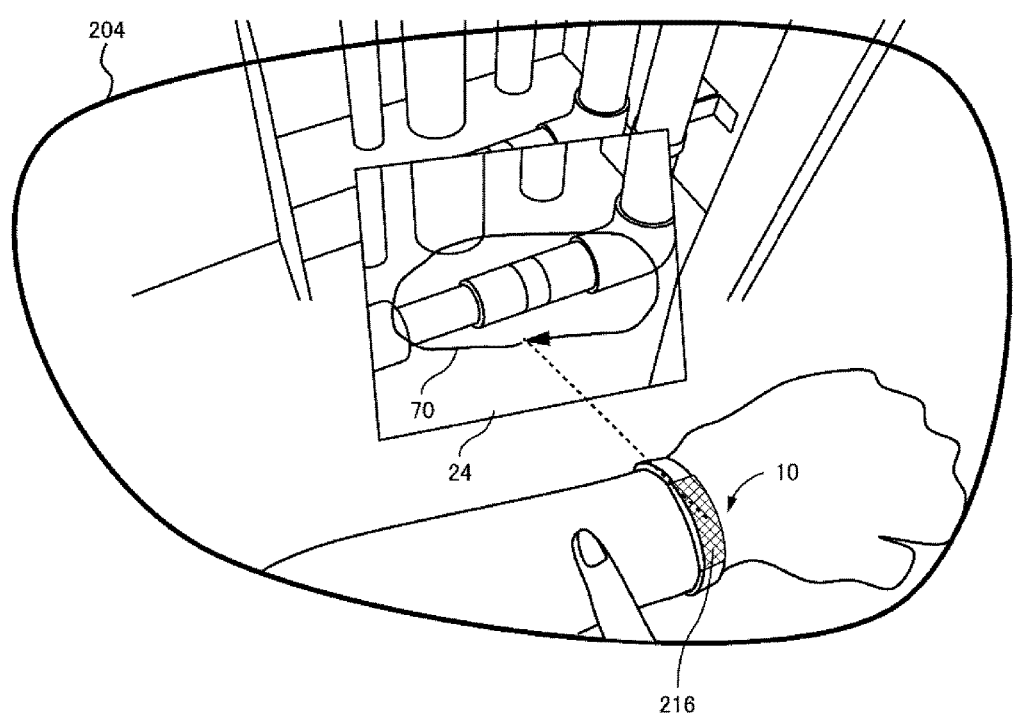
FIG. 26 is a diagram illustrating a scene in which the user draws a line.

The partial image 24 extracted by using the region 62 is displayed at the center of the display 204 by the display control unit 2080. Here, there is rust in a part of the pipe included in the partial image 24, and thus the user draws the line 70 on the partial image 24 by moving the marker image 216. In the above-described way, the user can save the partial image 24 after an especially focused point is emphasized. FIG. 26 illustrates a scene in which the user draws the line 70.

If the user selects the input button 302 from the operation selection menu 300, an input method selection menu 310 is displayed. The input method selection menu 310 includes three operation images such as a meter reading button 312, a numeric input button 314, and a memo button 316.

Figure 27:
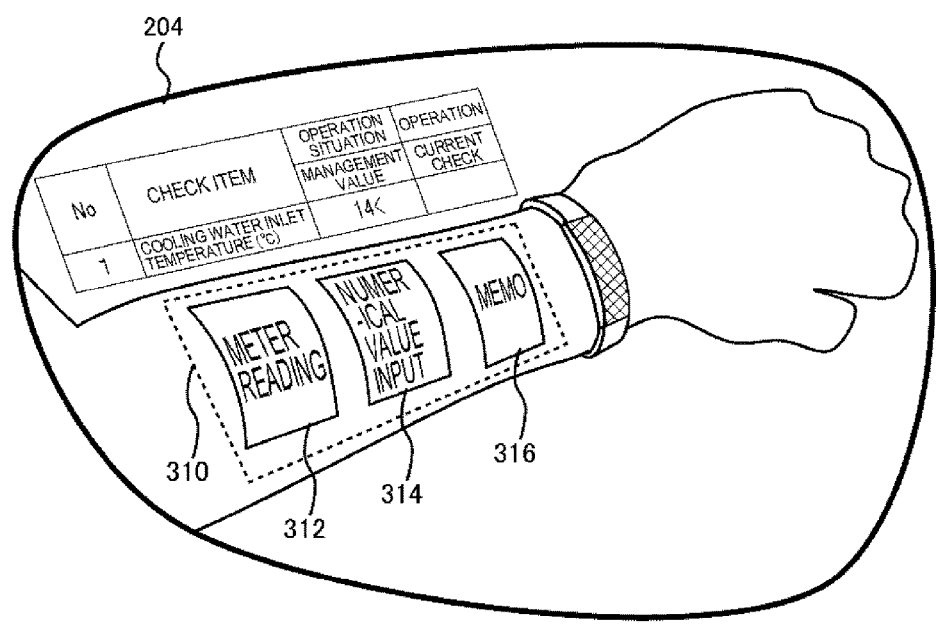
FIG. 27 is a diagram illustrating an input method selection menu included in the view of the user.

If the user selects the input button 302 from the operation selection menu 300, the glasses 200 display an input method selection menu 310 on the display 204. FIG. 27 is a diagram illustrating the input method selection menu 310 included in the view of the user. The input method selection menu 310 includes three operation images such as a meter reading button 312, a numeric input button 314, and a memo button 316.

The meter reading button 312 is an input operation of automatically reading a value of a meter from the captured image 22 generated by the camera 202. If the user selects the meter reading button 312, the glasses 200 transition to the first input mode. In a case where automatic reading of a value of the meter is finished, the glasses 200 transition to the second input mode again.

Figure 28:
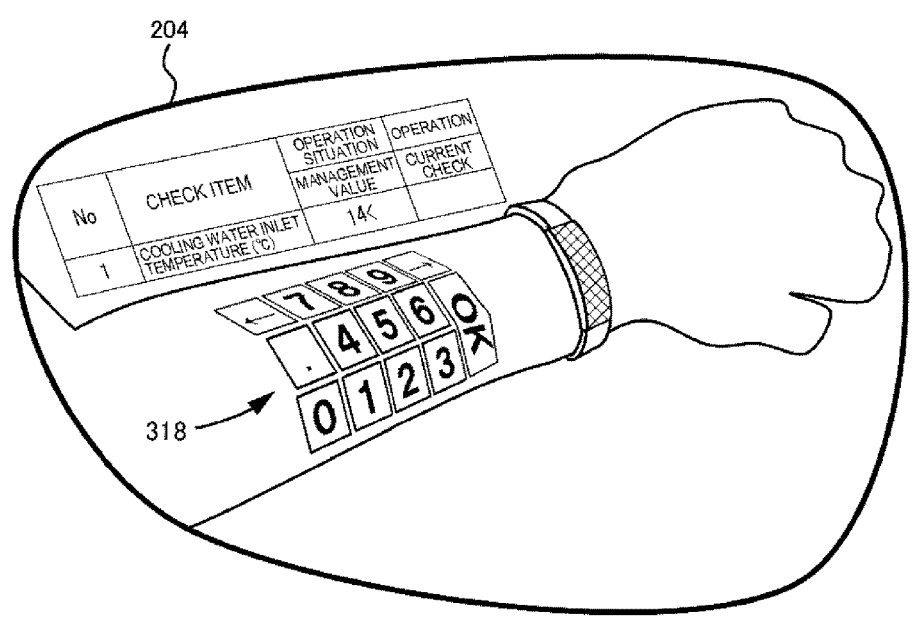
FIG. 28 is a diagram illustrating a scene after a numeric input button is selected.

The numeric input button 314 is an input operation of the user inputting a value of the meter. FIG. 28 is a diagram illustrating a scene after the numeric input button 314 is selected. The glasses 200 display a numeric pad image 318 on the display 204 such that the numeric pad image 318 is viewed to overlap the left arm 50. The user taps each key of the numeric pad image 318 so as to input a numerical value of the meter.

Figure 29:
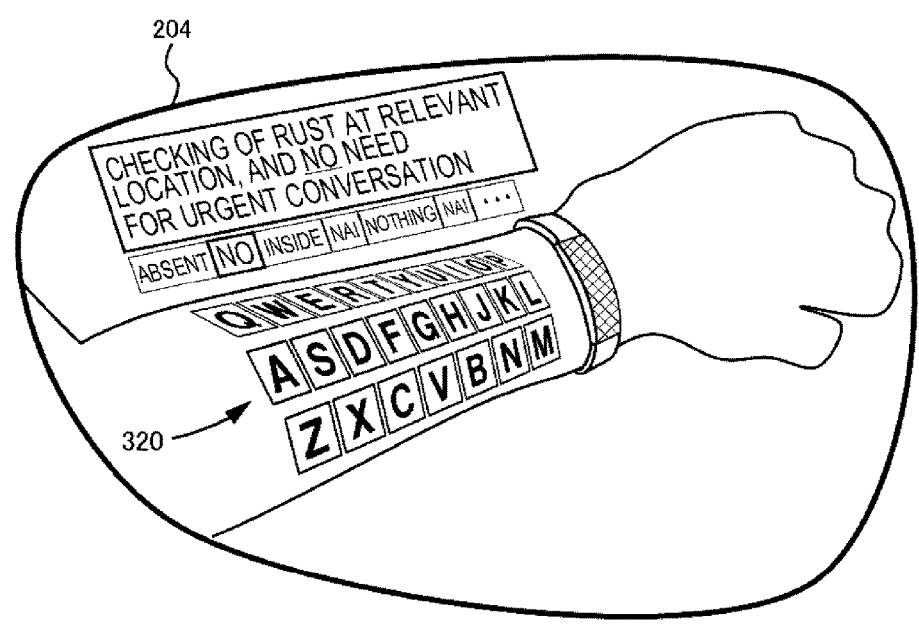
FIG. 29 is a diagram illustrating a scene after a memo button is selected.

The memo button 316 is an input operation for inputting a memo. FIG. 29 is a diagram illustrating a scene after the memo button 316 is selected. The glasses 200 display a keyboard image 320 on the display 204 such that the keyboard image 320 is viewed to overlap the left arm 50. The user taps each key of the keyboard image 320 so as to input a memo.

In a case where the user selects the record button 306 from the operation selection menu 300, an input operation on the current check item is finished, and transition to the next check item occurs. The user performs the above-described various input operations on the next check item. As mentioned above, the user performs input operations on each check item.

<Method of Displaying Guide 80>

Figure 30:
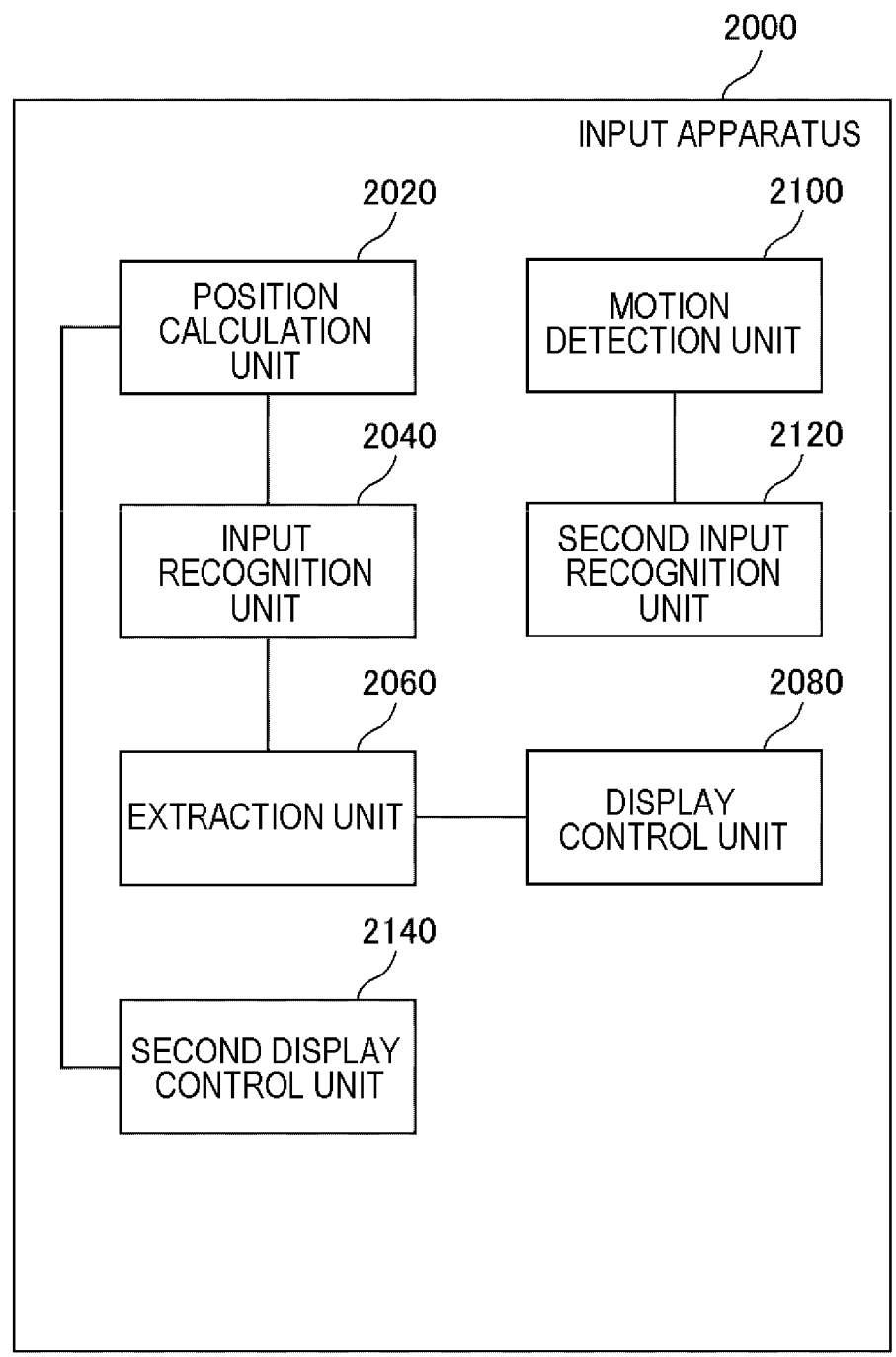
FIG. 30 is a block diagram illustrating the input apparatus including a second display control unit.

The input apparatus 2000 of the Example includes a second display control unit 2140 in order to display the guide 80. FIG. 30 is a block diagram illustrating the input apparatus 2000 including the second display control unit 2140.

In a case where the input apparatus 2000 includes the second display control unit 2140, the position calculation unit 2020 acquires the captured image 22 in a time series regardless of detection of vibration or the like in the sensor, and calculates a position of the marker included in each captured image 22. The second display control unit 2140 sequentially displays the guide 80 corresponding to the position of each of the markers arranged in a time series.

A display position of the guide 80 is a position corresponding to the input position 60 calculated on the basis of the position of the marker by the input recognition unit 2040. Specifically, the second display control unit 2140 calculates a display position of the guide 80 on the basis of the position of each marker calculated by the position calculation unit 2020, in the same method as the method of the input recognition unit 2040 calculating the input position 60 on the basis of the position of the marker.

In a case where the captured image 22 is displayed on a display screen, the second display control unit 2140 displays the guide 80 at the display position on the captured image 22 such that the guide 80 overlaps the captured image 22. On the other hand, in a case where the captured image 22 is not displayed on a display screen (for example, the user uses a transmissive head mounted display), the second display control unit 2140 calculates a position on the display screen corresponding to a display position on the captured image 22, and displays the guide at the position.

Note that, as described above, the correspondence relationship between a coordinate on the captured image 22 and a coordinate on the display screen is defined on the basis of various parameters (an angle of view or a focal length) related to the camera 20, or a positional relationship between the display screen and the camera 20. The correspondence relationship may be calculated by the second display control unit 2140 by using the parameters or the like, or may be set in advance as a set value.

In a case where the input recognition unit 2040 recognizes a certain point as input, the second display control unit 2140 displays the guide 80 indicating the input position 60 on the display screen. An indication representing the input position 60 is any mark such as a point, a cross point, a cross mark, or a circular mark having the input position 60 as a central position.

On the other hand, in a case where the input recognition unit 2040 recognizes a certain region as input, the second display control unit 2140 displays the guide 80 indicating the region 62 corresponding to the input position 60 on the display screen. A guide indicating representing the region 62 is, for example, a frame line indicating the region 62. The frame line may be any line such as a solid line, a dotted line, or a dot chain line. A guide indication representing the region 62 may represent vertexes of the region 62. The vertexes may be indicated by any mark such as a point, a cross point, a cross mark, or a circular mark. A guide indication representing the region 62 may be marks indicating both of a frame line and vertexes.

A color of the guide 80 may be any color.

Note that, although the present example targets checking work, an application range of the input apparatus 2000 is not limited to the checking work. For example, the input apparatus 2000 may be used for instrument assembling work, nursing work of a nurse or the like, and other various pieces of work.

As mentioned above, the example embodiments of the present invention have been described with reference to the drawings, but these are only examples of the present invention, and combinations of the example embodiments and various configurations other than the example embodiments may be employed.

Hereinafter, examples of reference embodiments are added.

1. An input apparatus comprising:

a position calculation unit calculating a position of a marker at a timing based on a result of detection by a sensor attached to the body of a user by using a captured image including the marker; and an input recognition unit recognizing input specifying a location on the captured image on the basis of the calculated position of the marker, wherein the specified location is a location separated from the marker, and wherein the marker is attached to the body of the user or is a part of the body of the user.

2. The input apparatus according to 1., wherein the input recognition unit recognizes a region located at a position separated from the calculated position of the marker as input, and wherein the input apparatus further includes an extraction unit extracting a partial image included in the region from the captured image.

3. The input apparatus according to 2., further comprising a display control unit displaying the partial image at a predetermined position on a display screen.

4. The input apparatus according to 3., wherein the display control unit displays the partial image extracted from the captured image on the display screen in an overlapping manner with another captured image.

5. The input apparatus according to 3. or 4., wherein the display screen is a display screen of a head mounted display or a projection surface of a projector.

6. The input apparatus according to any one of 3. to 5., wherein the display control unit displays an indication representing the specified location on the display screen.

7. The input apparatus according to any one of 1. to 6., further comprising:

a motion detection unit detecting motion of the marker at a time including a timing based on a result of detection by the sensor attached to the body of the user; and a second input recognition unit recognizing the detected motion of the marker as an input operation.

8. An input method executed by a computer, the method including:

a position calculation step of calculating a position of a marker at a timing based on a result of detection by a sensor attached to the body of a user by using a captured image including the marker; and an input recognition step of recognizing input specifying a location on the captured image on the basis of the calculated position of the marker, wherein the specified location is a location separated from the marker, and wherein the marker is attached to the body of the user or is a part of the body of the user.

9. The input method according to 8., wherein, in the input recognition step, recognizing a region located at a position separated from the calculated position of the marker as input, and wherein the input method further includes an extraction step of extracting a partial image included in the region from the captured image.

10. The input method according to 9., further including a display control step of displaying the partial image at a predetermined position on a display screen.

11. The input apparatus according to 10., wherein, in the display control step, displaying the partial image extracted from the captured image on the display screen in an overlapping manner with another captured image.

12. The input method according to 10. or 11., wherein the display screen is a display screen of a head mounted display or a projection surface of a projector.

13. The input method according to any one of 10. to 12., wherein, in the display control step, displaying an indication representing the specified location on the display screen.

14. The input method according to any one of 8. to 13., further including:

a motion detection step of detecting motion of the marker at a time including a timing a result of detection by the sensor attached to the body of the user; and a second input recognition step of recognizing the detected motion of the marker as an input operation.

15. A program causing a computer to execute each step in the input method according to any one of 8. to 14.

This application is based upon and claims the benefit of priority from Japanese Patent Application No. 2015-190239, filed Sep. 28, 2015; the entire contents of which are incorporated herein by reference.

What is claimed is:

1. An input apparatus comprising:
a memory storing instructions; and
a processor configured to execute the instructions to:
calculate a position of a marker at a timing by using a captured image including the marker, wherein the timing is based on a result of detection by a sensor attached to an object attached to a body of a user; and
recognize a location specified by the user on the captured image, wherein the specified location is determined based on a relationship between the specified location and the calculated position of the marker,
wherein the specified location is a location separated from the marker, and
wherein the marker is drawn on, printed on, or attached to the object.

2. An input apparatus comprising:
a memory storing instructions; and
a processor configured to execute the instructions to:
calculate a position of a marker at a timing by using a captured image including the marker, wherein the timing is based on a result of detection by a sensor attached to a body of a user; and
recognize a location specified by the user on the captured image, wherein the specified location is determined based on a relationship between the specified location and the calculated position of the marker,
wherein the specified location is a location separated from the marker, and
wherein the marker is an image displayed on a display screen of a device attached to an arm portion of the user.

3. The input apparatus according to claim 1,
wherein the processor is further configured to recognize a region located at a position separated from the calculated position of the marker, and
wherein the processor is further configured to extract a partial image included in the region from the captured image.

4. An input apparatus comprising:
a memory storing instructions; and
a processor configured to execute the instructions to:
calculate a position of a marker at a timing by using a captured image including the marker, wherein the timing is based on a result of detection by a sensor attached to a body of a user;
recognize a region specified by the user on the captured image, wherein the specified region is determined based on a relationship between the specified region and the calculated position of the marker; and
extract a partial image included in the region from the captured image,
wherein the specified region is separated from the marker, and
wherein the marker is attached to the body of the user or is a part of the body of the user.

5. The input apparatus according to claim 3, wherein the processor is further configured to display the partial image at a predetermined position on a display screen without user operation, in response to the extraction of the partial image.

6. The input apparatus according to claim 5, wherein the predetermined position of the display screen at which the partial image is displayed is a position of the partial image on the display screen at a timing of that the partial image is extracted.

7. The input apparatus according to claim 5, wherein the processor is further configured to display the partial image extracted from the captured image on the display screen in an overlapping manner with another captured image.

8. The input apparatus according to claim 5, wherein the display screen is a display screen of a head mounted display or a projection surface of a projector.

9. The input apparatus according to claim 5, wherein the processor is further configured to display an indication representing the specified location on the display screen.

10. The input apparatus according to claim 3, wherein the processor is further configured to recognize an input specifying a region with a size or a shape that is predetermined, the region being determined based on the calculated position of the marker.

11. The input apparatus according to claim 3, wherein a guide representing a region on the captured image is displayed, the region being determined based on the calculated position of the marker,
wherein the processor is further configured to receive an input specifying a region represented by the guide.

12. The input apparatus according to claim 1, wherein the sensor is a vibration sensor, an acceleration sensor, a vibration switch, a pressure sensor, or an electrostatic capacitance sensor, with which a touch to a body of the user is detected.

13. The input apparatus according to claim 1,
wherein the sensor is installed in a device attached to the user,
wherein the device changes an appearance of the device based on a result of detection by the sensor,
the processor is further configured to recognize the result of detection by the sensor by detecting a change in an appearance of the device using a captured image in which the device is imaged.

14. The input apparatus according to claim 1, wherein the processor is further configured to:
detect motion of the marker at a time including a timing based on a result of detection by the sensor attached to the body of the user; and
recognize the detected motion of the marker as an input operation.

15. An input method executed by a computer, the method comprising:
calculating a position of a marker at a timing by using a captured image including the marker, wherein the timing is based on a result of detection by a sensor attached to an object attached to a body of a user; and
recognizing a location specified by the user on the captured image, wherein the specified location is determined based on a relationship between the specified location and the calculated position of the marker,
wherein the specified location is a location separated from the marker, and
wherein the marker is drawn on, printed on, or attached to the object.

16. An input method executed by a computer, the method comprising:

calculating a position of a marker at a timing by using a captured image including the marker, wherein the timing is based on a result of detection by a sensor attached to a body of a user; and recognizing a location specified by the user on the captured image, wherein the specified location is determined based on a relationship between the specified location and the calculated position of the marker, wherein the specified location is a location separated from the marker, and wherein the marker is an image displayed on a display screen of a device attached to an arm portion of the user.

17. An input method executed by a computer, the method comprising:

calculating a position of a marker at a timing by using a captured image including the marker, wherein the timing is based on a result of detection by a sensor attached to an object attached to a body of a user;

recognizing a region specified by the user on the captured image, wherein the specified region is determined based on a relationship between the specified region and the calculated position of the marker;

extracting a partial image included in the region from the captured image, wherein the specified region is separated from the marker, and wherein the marker is attached to the body of the user or is a part of the body of the user.

18. A non-transitory computer-readable storage medium storing a program causing a computer to execute:

calculating a position of a marker at a timing by using a captured image including the marker, wherein the timing is based on a result of detection by a sensor attached to an object attached to a body of a user; and recognizing a location specified by the user on the captured image, wherein the specified location is determined based on a relationship between the specified location and the calculated position of the marker, wherein the specified location is a location separated from the marker, and wherein the marker is drawn on, printed on, or attached to the object.

19. A non-transitory computer-readable storage medium storing a program causing a computer to execute:

calculating a position of a marker at a timing by using a captured image including the marker, wherein the timing is based on a result of detection by a sensor attached to an object attached to a body of a user; and recognizing a location specified by the user on the captured image, wherein the specified location is determined based on a relationship between the specified location and the calculated position of the marker, wherein the specified location is a location separated from the marker, and wherein the marker is an image displayed on a display screen of a device attached to an arm portion of the user.

20. A non-transitory computer-readable storage medium storing a program causing a computer to execute:

calculating a position of a marker at a timing by using a captured image including the marker, wherein the timing is based on a result of detection by a sensor attached to an object attached to a body of a user;

recognizing a region specified by the user on the captured image, wherein the specified region is determined based on a relationship between the specified region and the calculated position of the marker;

extracting a partial image included in the region from the captured image, wherein the specified region is separated from the marker, and wherein the marker is attached to the body of the user or is a part of the body of the user.

* * * * *